United States Patent
Bhattad et al.

(10) Patent No.: US 11,895,699 B2
(45) Date of Patent: Feb. 6, 2024

(54) LISTEN-BEFORE-TALK (LBT) TYPE AND GAP SIGNALING FOR BACK-TO-BACK GRANTS AND MULTI-TRANSMISSION TIME INTERVAL (MULTI-TTI) GRANTS

(71) Applicant: QUALCOMM INCORPORATED, San Diego, CA (US)

(72) Inventors: Kapil Bhattad, Bangalore (IN); Jing Sun, San Diego, CA (US); Ananta Narayanan Thyagarajan, Bangalore (IN); Xiaoxia Zhang, San Diego, CA (US); Tanumay Datta, Bangalore (IN); Pravjyot Singh Deogun, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 16/783,964

(22) Filed: Feb. 6, 2020

(65) Prior Publication Data
US 2020/0260487 A1    Aug. 13, 2020

(30) Foreign Application Priority Data
Feb. 11, 2019    (IN) .............................. 201941005313

(51) Int. Cl.
*H04W 74/08* (2009.01)
*H04W 72/0446* (2023.01)
(Continued)

(52) U.S. Cl.
CPC ....... *H04W 74/0808* (2013.01); *H04L 5/0051* (2013.01); *H04L 5/0082* (2013.01);
(Continued)

(58) Field of Classification Search
CPC . H04W 74/0808; H04W 76/27; H04W 48/16; H04W 72/0446; H04W 72/14; H04L 5/0051; H04L 5/0082
See application file for complete search history.

(56) References Cited

U.S. PATENT DOCUMENTS 10,880,068 B2 * 12/2020 Liu .................. H04W 72/1289
2013/0315159 A1 * 11/2013 Xia .................... H04W 72/042
370/329
(Continued)

FOREIGN PATENT DOCUMENTS

CN        106465425 A    2/2017

OTHER PUBLICATIONS

International Search Report and Written Opinion—PCT/US2020/017255—ISA/EPO—dated May 18, 2020.
(Continued)

*Primary Examiner* — Michael Thier
*Assistant Examiner* — Nevena Zecevic Sandhu
(74) *Attorney, Agent, or Firm* — Haynes and Boone, LLP

(57) ABSTRACT

Wireless communications systems, apparatuses, and methods are provided. A method of wireless communication may include communicating, by a first wireless communication device with a second wireless communication device, a first scheduling grant indicating a gap period within a first scheduled period and communicating, by the first wireless communication device with the second wireless communication device during the first scheduled period, a first communication signal including a first silence period corresponding to the gap period.

25 Claims, 13 Drawing Sheets

(51) Int. Cl.
  H04W 48/16    (2009.01)
  H04L 5/00     (2006.01)
  H04W 76/27    (2018.01)
  H04W 72/23    (2023.01)

(52) U.S. Cl.
  CPC ....... H04W 48/16 (2013.01); H04W 72/0446 (2013.01); H04W 72/23 (2023.01); H04W 76/27 (2018.02)

(56) References Cited

U.S. PATENT DOCUMENTS

| | | | |
|---|---|---|---|
| 2015/0264662 A1* | 9/2015 | Sahlin | H04W 72/1289 370/280 |
| 2016/0262000 A1* | 9/2016 | Koorapaty | H04W 48/12 |
| 2018/0041317 A1* | 2/2018 | Simonsson | H04L 5/0048 |
| 2018/0145814 A1* | 5/2018 | Liu | H04W 28/16 |
| 2020/0260480 A1* | 8/2020 | Wu | H04W 74/0833 |
| 2020/0358487 A1* | 11/2020 | Yang | H04L 1/1614 |
| 2021/0329647 A1* | 10/2021 | Park | H04W 72/005 |
| 2021/0410187 A1* | 12/2021 | Yang | H04W 74/0816 |

OTHER PUBLICATIONS

Nokia, et al., "On Uplink Signal and Channel Structures for NR-U", 3GPP Draft, 3GPP TSG RAN WG1 Ad-Hoc Meeting 1901, R1-1900260, UL Signal and Channels, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593174, 12 pages, Retrieved from the Internet: URL: http://www.3gpp.org/ftp/Meetings%5F3GPP%5FSYNC/RAN1/Docs/R1%2D1900260%2Ezip. [retrieved on Jan. 20, 2019] SRS; p. 9, paragraph 5.

Qualcomm Incorporated: "Enhancements to Scheduling and HARQ operation for NR-U", R1-1900875, 3GPP TSG RAN WG 1 Meeting#AH1901, Jan. 12, 2019 (Jan. 12, 2019), 11 Pages, Retrieved from the Internet: URL: http://www.3gpp.org/ftp/Meetings%5F3GPP%5FSYNC/RAN1/Docs/R1%2D1900875%2Ezip. [retrieved on Jan. 20, 2019].

Xiaomi: "Frame Structure for NR-U", 3GPP Draft, 3GPP TSG RAN WG1 Meeting #95, R1-1813360, Frame Structure for NR-U, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555392, 5 pages, Retrieved from the Internet: URL: http://www.3gpp.org/ftp/Meetings%5F3GPP%5FSYNC/RAN1/Docs/R1%2D1813360%2Ezip. [retrieved on Nov. 11, 2018] Discussion—Bi-directional MCOT; p. 5, paragraph 2.

* cited by examiner

LISTEN-BEFORE-TALK (LBT) TYPE AND GAP SIGNALING FOR BACK-TO-BACK GRANTS AND MULTI-TRANSMISSION TIME INTERVAL (MULTI-TTI) GRANTS

CROSS REFERENCE TO RELATED APPLICATIONS

The present application claims priority to and the benefit of Indian Provisional Patent Application No. 201941005313, filed Feb. 11, 2019, which is hereby incorporated by reference in its entirety as if fully set forth below and for all applicable purposes.

TECHNICAL FIELD

This application relates to wireless communication systems, and more particularly to signaling a listen-before-talk (LBT) mode and/or transmission gaps for back-to-back grants and/or multi-transmission time interval (multi-TTI) grants in a spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a BS may schedule a UE for an uplink (UL) transmission in the shared spectrum. The UE may perform an LBT procedure prior to the scheduled time. Upon a successful LBT, the UE may proceed with the UL transmission according to the schedule. Otherwise, the UE may refrain from transmitting in the spectrum. To reduce LBT overheads, the BS may schedule the UE with multiple contiguous transmission time intervals (TTIs). The multiple TTI allocations allow the UE to continuously occupy the spectrum without having to perform an LBT prior to each transmission in the multiple TTIs. However, the multiple TTI allocations can delay other nodes from accessing the spectrum and/or blocked other preconfigured scheduled transmissions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising communicating, by a first wireless communication device with a second wireless communication device, a first scheduling grant indicating a gap period within a first scheduled period; and communicating, by the first wireless communication device with the second wireless communication device during the first scheduled period, a first communication signal including a first silence period corresponding to the gap period.

In an additional aspect of the disclosure, an apparatus comprising a transceiver configured to communicate, with a wireless communication device, a first scheduling grant indicating a gap period within a first scheduled period; and communicate, with the wireless communication device during the first scheduled period, a first communication signal including a first silence period corresponding to the gap period.

In an additional aspect of the disclosure, a non-transitory computer-readable medium having program code recorded thereon, the program code comprising code for causing a first wireless communication device to communicate, with a second wireless communication device, a first scheduling grant indicating a gap period within a first scheduled period; and code for causing the first wireless communication device to communicate, with the second wireless communication device during the first scheduled period, a first communication signal including a first silence period corresponding to the gap period.

In an additional aspect of the disclosure, an apparatus comprising means for communicating, with a wireless communication device, a first scheduling grant indicating a gap period within a first scheduled period; and means for communicating, with the wireless communication device during the first scheduled period, a first communication signal including a first silence period corresponding to the gap period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
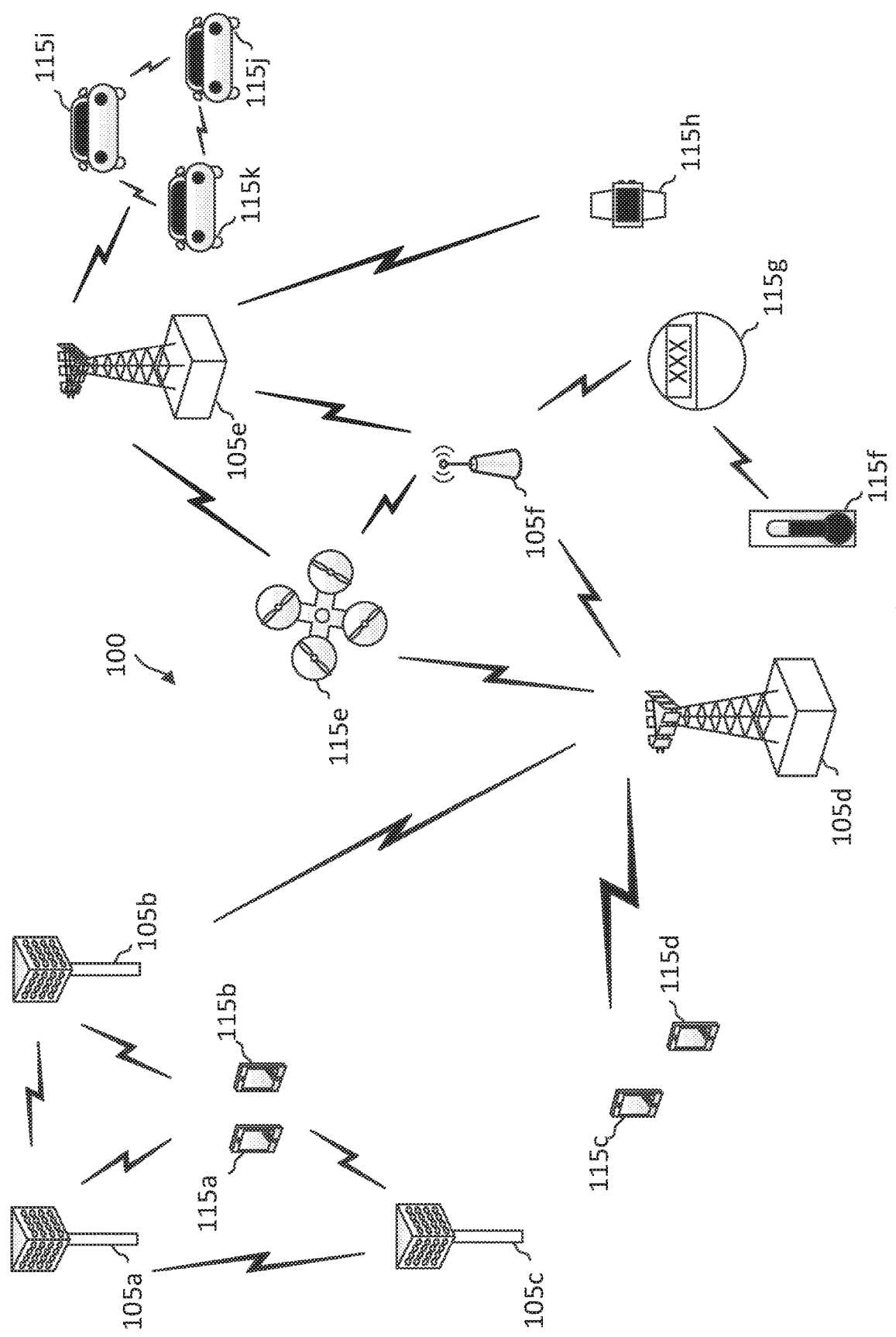
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 404.11, IEEE 404.16, IEEE 404.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for signaling an LBT mode and/or transmission gaps for multi-transmission time interval (multi-TTI) UL grants and/or back-to-back UL grants in a spectrum shared by multiple network operating entities. A multi-TTI UL grant refers to a BS transmitting a single grant to provide a UE with multiple allocations or multiple TTIs for UL transmissions. Back-to-back UL grants refers to a BS transmitting two independent UL grants back-to-back in time. In some instances, the two independent grants can include two single TTI grants. In some instances, the two independent grants can include two multi-TTI grants, each including contiguous TTI allocations. In some instances, the two independent grants can include a single TTI grant and a multi-TTI grant (e.g., with contiguous TTI allocations). In the disclosed embodiments, a BS may configure a gap period within a multi-TTI UL allocation or create a gap period between two independent back-to-back UL grants. The gap period provides opportunities for other nodes to access the spectrum for communications and/or for the BS to update transmission parameters for a subsequent schedule for channel variation adaptation. The BS may communicate with the UE during a period including a gap by applying rate-matching or puncturing.

In an embodiment, the BS configures a UE with a multi-TTI UL grant and includes a gap indication and/or an LBT mode indication in the multi-TTI UL grant. To reduce signaling overhead, the BS can restrict the number of gaps and/or locations of the gaps within a certain period. In an embodiment, the BS can configure the UE with partial gap information via a radio resource control (RRC) configuration.

In an embodiment, the BS may transmit discovery reference signals (DRSs) based on a predetermined schedule and may transmit the DRS configuration information indicating the predetermined schedule. In addition, the BS may transmit random access resource configuration information to facilitate random access procedures for initial network access. Further, the BS may transmit slot format indicators (SFIs) to indicate whether a symbol is configured for uplink (UL) communication, DL communication, or flexible for either UL or DL communication. In such an embodiment, the UE can autonomously create a gap period in a scheduled UL transmission when the scheduled UL transmission overlaps with the DRS schedule, the random access resource, or a symbol configured for DL communication based on the SFI.

In an embodiment, the BS configures a UE with back-to-back UL grants (e.g., a previous UL grant and a current UL grant). The UE can determine a gap period between the back-to-back grants and/or an LBT mode for a transmission after the gap period based on the current UL grant, the previous UL grant, a transmission status in a previous scheduled period granted by the previous UL grant, and/or a transmission status (e.g., a transmission duration) in a current scheduled period granted by the current UL grant.

In an embodiment, the BS may transmit an SFI. The BS may transmit common control information indicating a gap period configured for multiple UEs. In such an embodiment, the UE can determine a gap period and/or an LBT mode based on the SFI and/or the common control information.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In an FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) period in the shared channel by performing a category 4 (CAT4) LBT. A CAT4 LBT refers to an LBT with a random backoff and a variable contention window. After acquiring the COT, the BS 105 may schedule one or more UEs 115 for UL and/or DL communications in the COT. In addition, the BS 105 may configure RACH opportunities to allow other UEs 115 to perform initial network access. Further, the COT may include time periods that are scheduled for discovery reference signal (DRS) transmissions. Thus, the BS 105 may transmit DRSs during the COT according to the DRS schedule. The DRSs may refer to the broadcast system information signals, such as the PSS, SSS, MIB, SIBs, RMSI, a OSI, and/or SSBs that facilitate network access and synchronization.

In some embodiments, the BS 105 may schedule a UE 115 with multi-TTI grants for UL communications over a shared channel and may include one or more gap periods within a scheduled period to provide opportunities for other nodes (e.g., the BSs 105 or the UEs 115) to access the spectrum. In some embodiments, the BS 105 may create gap periods by scheduling back-to-back or consecutive UL transmission grants with transmission periods that are spaced apart in time. Mechanisms for signaling gap periods with multi-TTI UL grants and back-to-back UL grants and/or associated LBT modes are described in greater detail herein.

Figure 2:
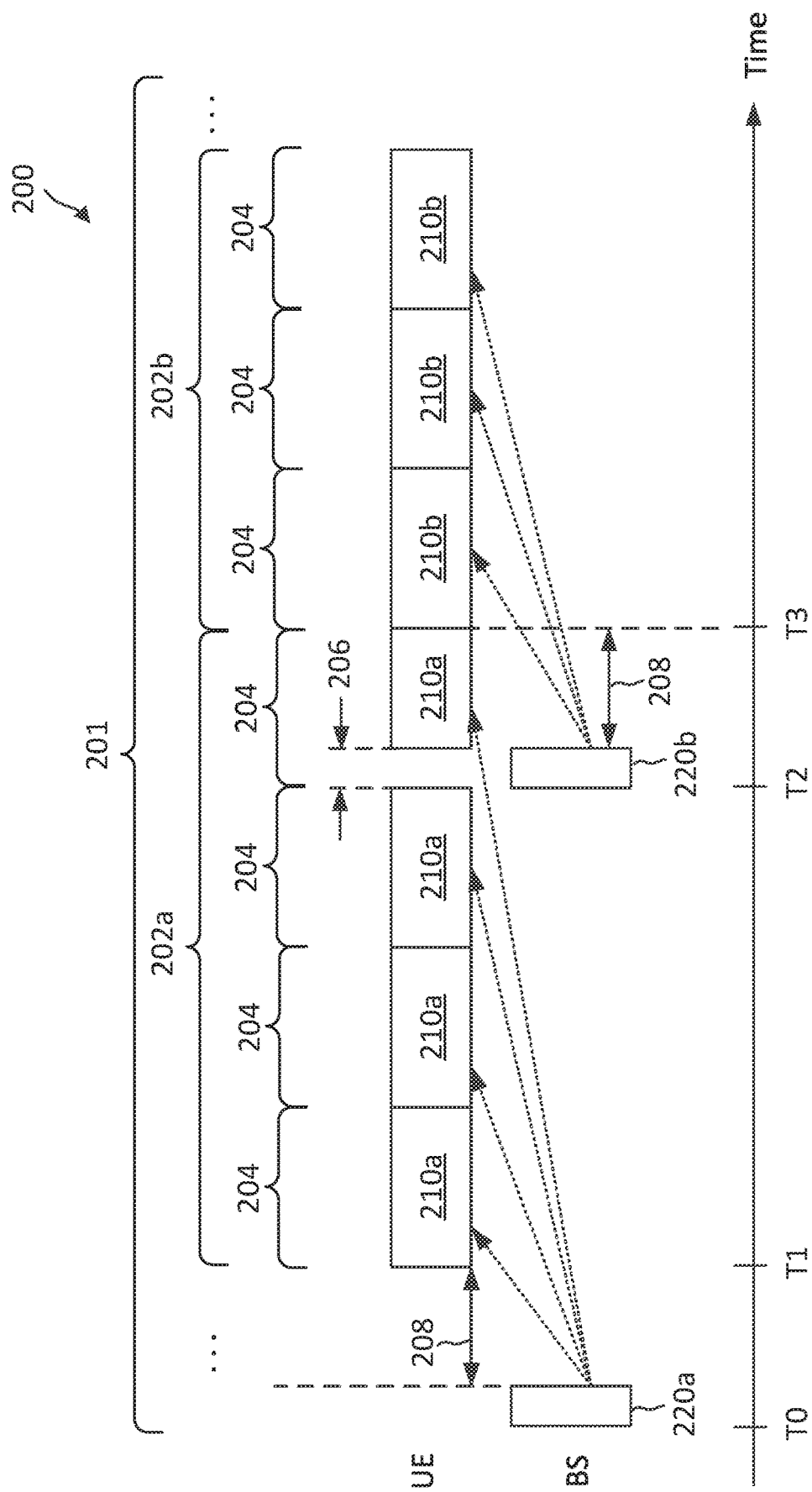
FIG. 2 is a timing diagram illustrating a transmission scheme with multi-transmission time interval (multi-TTI) grants according to some embodiments of the present disclosure.

FIG. 2 is a timing diagram illustrating a transmission scheme 200 that implements multi-TTI grants with gap periods according to some embodiments of the present disclosure. The scheme 200 may be employed by a BS such as the BSs 105 and a UE such as the UEs 115 in a network such as the network 100. In particular, a BS may employ the scheme 200 to schedule one or more UEs with multi-TTI UL transmissions. In FIG. 2, the x-axis represents time in some constant units. As an example, the BS performs a CAT4 LBT in a medium, which may be an unlicensed spectrum or a shared spectrum. When the LBT passes, the BS reserves a TXOP 201 in the medium. The BS schedules a UE for UL transmissions during the TXOP 201.

At time T0, the BS transmits a UL scheduling grant 220a granting the UE with multiple UL transmissions during the TXOP 201. The UL scheduling grant 220a indicates a period 202a scheduled or allocated for the UE. The UL scheduling grant 220a may indicate multiple TTIs or transmission slots 204 in the scheduled period 202. The UL scheduling grant 220 may be referred to as a multi-TTI grant. For simplicity of discussion and illustration, the scheduled period 202a includes four transmission slots 204. However, a BS may schedule any suitable number of transmission slots 204 (e.g., about 2, 3, 5, or 6 or more) within a scheduled period 202 for a multi-TTI grant. The duration of a transmission slot 204 may vary depending on the embodiments. In some embodiments, each transmission slot 204 may include about 14 OFDM symbols and may span about 1 millisecond (ms). In general, each transmission slot 204 may include any suitable number of symbols and/or span any suitable amount of time. The UL scheduling grant 220a may additionally include other transmission parameters, such as MCSs and/or power control parameters, for the scheduled UL transmissions.

Upon receiving the UL scheduling grant 220a, the UE transmits a UL communication signal 210a in each transmission slot 204 of the scheduled period 202a. Each UL communication signal 210a may include a medium access control (MAC) layer transport block (TB) (e.g., carrying UL information data). In some instances, a UL communication signal 210 may include multiple TBs with spatial multiplexing, for example, in a MIMO system. In the context of LTE or 5G, the UL scheduling grant 220a may be carried in a PDCCH and the UL communication signals 210a may be carried in a PUSCH. In general, the UL communication signals 210 can include UL data and/or UL control information.

As shown, the BS transmits the UL scheduling grant 220a in advance of the scheduled period 202a, for example, by a duration 208. The UL scheduling grant 220a may indicate that the scheduled period 202 begins at time T1. The duration 208 provides time for the UE to process the UL scheduling grant 220a and/or prepare for the UL transmissions. For example, the UE may generate a TB based on the MCS and the number of symbols in the transmission slots 204 indicated by the UL scheduling grant 220a.

To enable adaptation to the varying channel conditions, the BS may update transmission parameters (e.g., MCS) and transmit a UL scheduling grant 220b to indicate the updated transmission parameters and corresponding scheduled period 202b. However, there is a minimum gap (e.g., the duration 208) required between the UL scheduling grant 220b and the corresponding scheduling period 202b to account for the UE's processing delay as described above. To avoid having any unused resources, the BS may transmit the UL scheduling grant 220b in the previous scheduled period 202a. As shown, the last transmission slot 204 in the scheduled period 202a includes a gap period 206 beginning at time T2 to enable the BS to transmit the UL scheduling grant 220b in advance of the scheduled period 202b beginning at time T3. Thus, the last transmission slot 204 has a shortened duration. The UE may transmit the UL communication signal 210a in the shortened transmission slot 204 by apply puncturing or rate-matching around the gap period 206.

Upon receiving the updated UL scheduling grant 220b, the UE transmits a UL communication signal 210b in each of the transmission slots 204 of the scheduled period 202b according to the updated transmission parameters in the UL scheduling grant 220b.

In order for the UE to leave a gap period 206 within a scheduled transmission slot 204, the BS is required to signal timing information associated with the gap period 206 to the UE. In addition, the inclusion of gap periods may also lead to the need to determine whether an LBT is required when a UE is scheduled to transmit after a gap period.

Accordingly, the present disclosure provides techniques to configure gap periods for multi-TTI grants and/or back-to-back TTI grants. In addition, the present disclosure provides techniques to signal the configured gap periods and/or associated LBT modes. Mechanisms for flexible gap period configurations, gap periods signaling, and/or LBT handling are described in greater detail herein.

Figure 3:
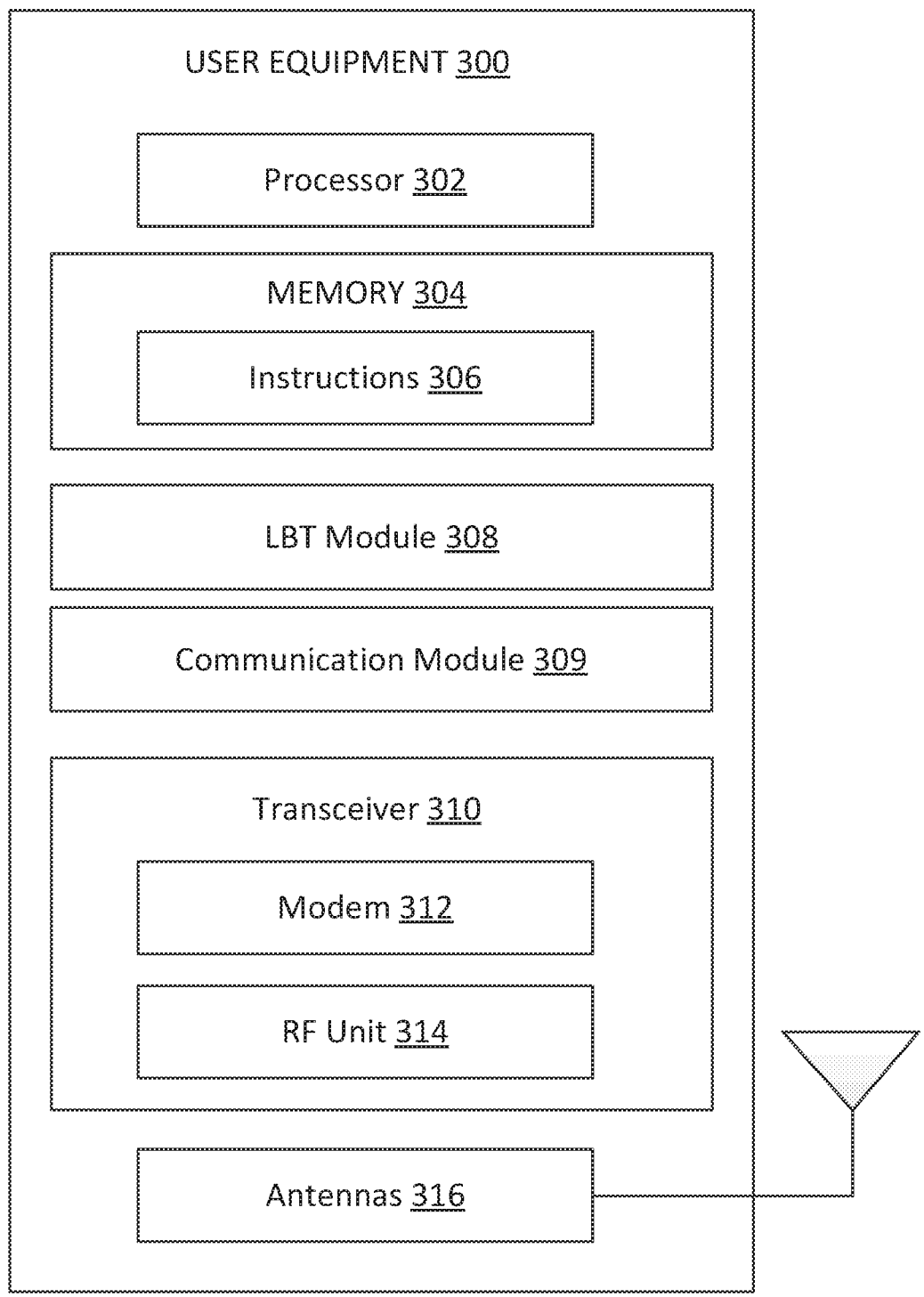
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above. As shown, the UE 300 may include a processor 302, a memory 304, a communication module 308, an LBT module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 5-13. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the communication module 308 and the LBT module 309 may be implemented via hardware, software, or combinations thereof. For example, each of the communication module 308 and the LBT module 309 may be implemented as a processor, circuit, and/or instructions 306 stored in the memory 304 and executed by the processor 302. In some examples, the communication module 308 and/or the LBT module 309 can be integrated within the modem subsystem 312. For example, the communication module 308 and/or the LBT module 309 can be implemented by a combination of software components (e.g., executed by a DSP or a general processor) and hardware components (e.g., logic gates and circuitry) within the modem subsystem 312. In some examples, a UE may include the communication module 308 or the LBT module 309. In other examples, a UE may include the communication module 308 and the LBT module 309.

The communication module 308 and the LBT module 309 may be used for various aspects of the present disclosure, for example, aspects of FIGS. 5-13. In an example, the communication module 308 is configured to monitor for PDCCH, SFI, and/or system information from a BS (e.g., the BS 105), receive, from the BS, a multi-TTI UL grant indicating a gap period within one or more of the multiple scheduled TTIs and/or an LBT mode associated with the gap periods, an RRC message including partial gap information and/or an LBT mode (e.g., no LBT or a category 2 (CAT2) LBT) associated with a gap period, a DRS transmission schedule, random access resource configuration information, and/or an SFI based on the monitoring. The communication module 308 is further configured to identify a gap period within a scheduled TTI and/or an LBT mode associated with the gap period based on the multi-TTI grant, the partial gap information, the DRS transmission schedule, the random access resource configuration information, and/or the SFI. The communication module 308 is further configured to transmit a UL communication signal during the scheduled TTI including the identified gap period by applying rate-matching or puncturing to the UL transmission so that the UL transmission spans a shortened duration to accommodate the identified gap period and/or perform an LBT prior to the UL transmission based on the identified LBT mode.

In an example, the communication module 308 is configured to receive, from a BS (e.g., the BSs 105), back-to-back UL grants (e.g., a previous scheduling grant and a current scheduling grant), an SFI, and/or common PDCCH information, determine a gap period between scheduled periods granted by the back-to-back grants based on the previous scheduling grant, the current scheduling grant, the SFI, the received common PDCCH information. The communication module 308 is further configured to determine an LBT mode (e.g., no LBT or a CAT2 LBT) for a transmission granted by the current scheduling grant based on LBT determination rules indicated by the previous scheduling grant, and/or the current scheduling grant, a transmission status in the previous scheduled period, and/or a transmission duration in the current scheduling period. The communication module 308 is further configured to transmit a UL communication signal during the current scheduled period by applying rate-matching or puncturing to the UL transmission so that the UL transmission spans a shortened duration to accommodate the identified gap period, and/or perform an LBT prior to the UL transmission based on the identified LBT mode.

In an example, the LBT module 309 is configured to perform a CAT2 LBT or no LBT prior to a UL transmission based on an LBT mode determined by the communication module 308.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the communication module 308, according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
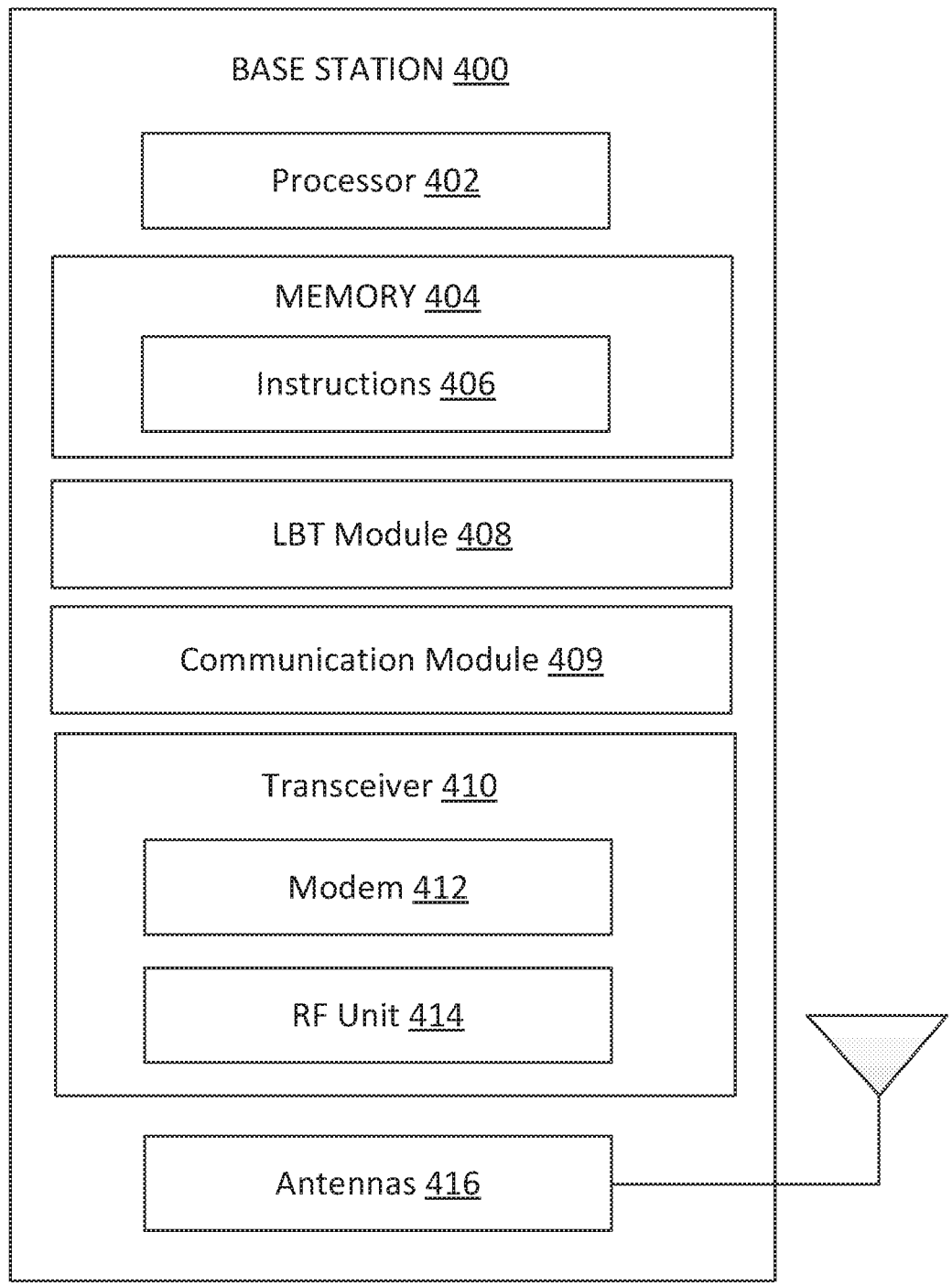
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 in the network 100 as discussed above. A shown, the BS 400 may include a processor 402, a memory 404, a communication module 408, an LBT module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIG. 5-13. Instructions 406 may also be referred to as code, which may be interpreted broadly to include any type of computer-readable statement(s) as discussed above with respect to FIG. 3.

Each of the communication module 408 and the LBT module 409 may be implemented via hardware, software, or combinations thereof. For example, each of the communication module 408 and the LBT module 409 may be implemented as a processor, circuit, and/or instructions 406 stored in the memory 404 and executed by the processor 402. In some examples, the communication module 408 and/or the LBT module 409 can be integrated within the modem subsystem 412. For example, the communication module 408 and/or the LBT module 409 can be implemented by a combination of software components (e.g., executed by a DSP or a general processor) and hardware components (e.g., logic gates and circuitry) within the modem subsystem 412. In some examples, a BS may include the communication module 408 or the LBT module 409. In other examples, a BS may include the communication module 408 and the LBT module 409.

The communication module 408 and the LBT module 409 may be used for various aspects of the present disclosure, for example, aspects of FIGS. 5-13. In an example, the communication module 408 is configured to transmit, to a UE (e.g., the UEs 115 and 300), a multi-TTI UL grant indicating a gap period within one or more of the multiple scheduled TTIs and/or an LBT mode associated with the gap period, an RRC message including partial gap information and/or an LBT mode (e.g., no LBT or a CAT2 LBT) associated with a gap period, a DRS transmission schedule, configuration information for a random access resource, and/or an SFI. The communication module 408 is further configured to receive, from the UE, a UL communication signal during a scheduled TTI including a gap period based on the multi-TTI grant, the SFI, the DRS schedule, and/or random access resource, and/or apply rate-matching or puncturing to the received UL communication signal according to the gap period.

In an example, the communication module 408 is configured to transmit, to a UE (e.g., the UEs 115 and 300), back-to-back UL grants (e.g., a previous scheduling grant and a current scheduling grant), an SFI, and/or common PDCCH information indicating a gap period configured for multiple UEs. The communication module 408 is further configured to receive, from the UE, a UL communication signal during a scheduled period after a gap period based on the back-to-back grant, the SFI, and/or the common PDCCH information, and/or apply rate-matching or puncturing to the received UL communication signal according to the gap period.

In an example, the LBT module 409 is configured to perform an LBT (e.g., a CAT4 LBT) to reserve a TXOP and/or an LBT (e.g., a CAT2 LBT) after a UL-to-DL switch within the TXOP.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

FIGS. 5-8 illustrate various mechanisms for signaling multi-TTI UL grants with gap periods and/or associated LBT types or LBT modes. In FIGS. 5-8, the schemes 500-800 may be employed by BSs such as the BSs 105 and 400 and UEs such as the UEs 115 and 300 in a network such as the network 100. In particular, a BS may employ the schemes 500, 600, 700, and/or 800 to configure a UE with multi-TTI allocations including gap periods. The schemes 500-800 are suitable for use in a network operating over a shared spectrum and/or an unlicensed spectrum. The gap periods provide opportunities for other wireless communication devices (e.g., BSs and/or UEs) to access the spectrum without having to wait till the end of a multi-TTI allocation, while maintaining a minimal LBT overhead for UL communications. Additionally, the x-axes represent time in some constant units.

Figure 5:
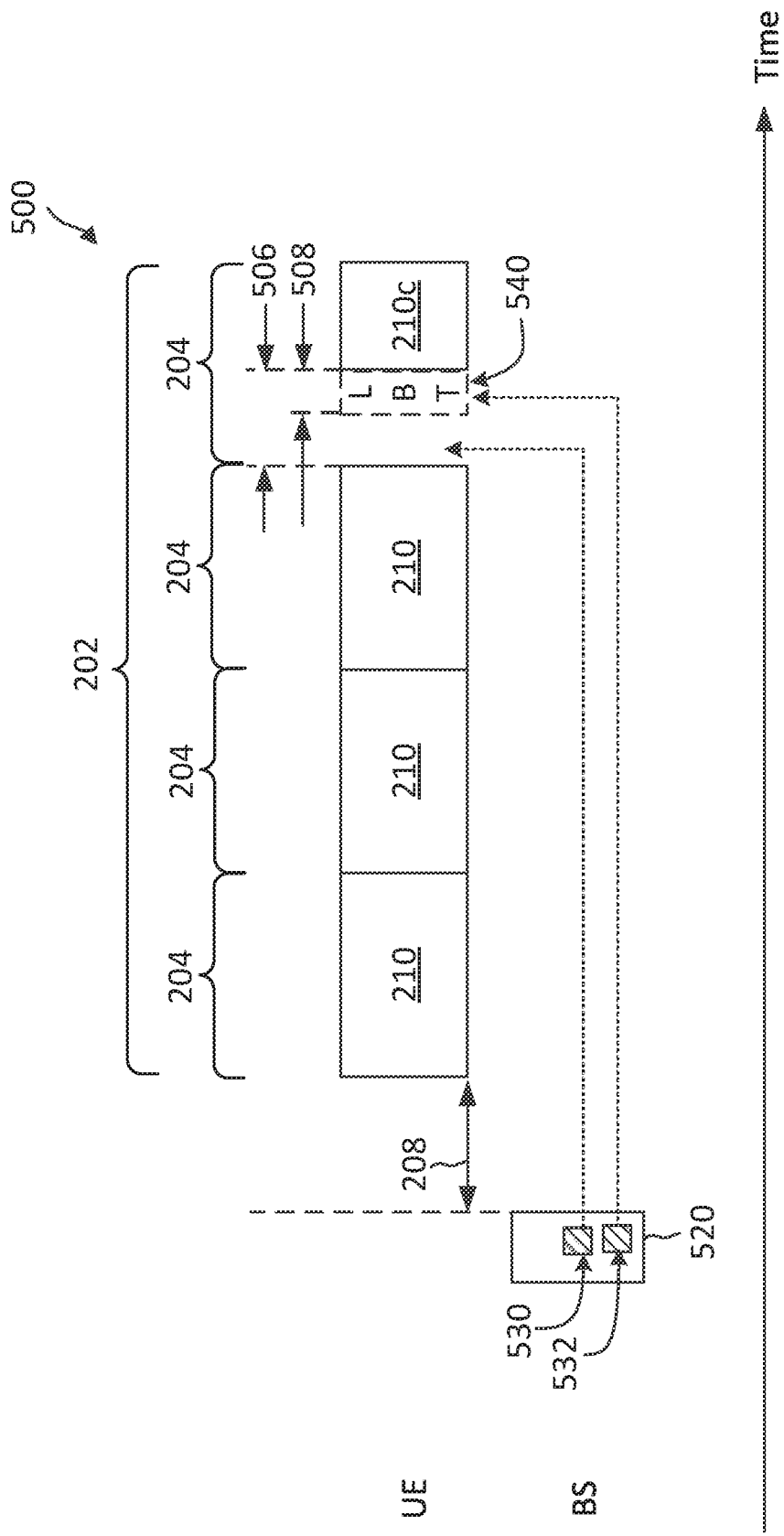
FIG. 5 is a timing diagram illustrating a transmission scheme with multi-TTI grants and gap and/or listening-before-talk (LBT) type signaling according to some embodiments of the present disclosure.

FIG. 5 is a timing diagram illustrating a transmission scheme 500 with multi-TTI grants and gap and/or LBT type signaling according to some embodiments of the present disclosure. In the scheme 500, a BS may configure a UE with a multi-TTI UL allocation including a gap period to allow for other communications, such as DL control signaling, DRS, and/or random access preamble transmissions. The scheme 500 is described using a substantially similar allocation configuration as the scheme 200 and may use the same reference numerals as in FIG. 2 for simplicity's sake. For example, the BS transmits a UL scheduling grant 520 to the UE. The UL scheduling grant 520 indicates a period 202 including a plurality of transmission slots 204 allocated to the UE for UL transmissions. The allocation may be indicated in the form of RBs including time-frequency resources. The UL scheduling grant 520 may additionally indicate transmission parameters (e.g., MCS and/or power control parameters) for transmissions in the transmission slots 204. The BS may transmit the UL scheduling grant 520 in advance of the scheduled period 202, by a duration 208 to accommodate the UE's processing delay. The BS may transmit the UL scheduling grant 520 in the form of a downlink control information (DCI) carried in a PDCCH signal. The BS may configure the UE with PDCCH monitoring occasions (e.g., predetermined periods). The BS may transmit the UL scheduling grant 520 according to the PDCCH monitoring occasions. The UE may monitor for DCI (e.g., the UL scheduling grant 520) according to the PDCCH monitoring occasions.

To allow for a flexible gap period in a multi-TTI allocation, the BS includes a gap indicator 530 in the UL scheduling grant 520. The gap indicator 530 indicates a gap period 506 within the scheduled period 202. The gap indicator 530 may indicate a time location (e.g., a symbol number) and/or a duration (e.g., in units of symbols) of the gap period 506. As an example, the scheduled period 202 may include about 70 symbols indexed 0 to 69. The gap indicator 530 may indicate that the gap period 506 begins at a certain symbol number (e.g., indexed 60) and a duration of one symbol. To indicate the gap period 506 of one symbol duration in any of the symbols within the scheduled period 202, the gap indicator 530 may require about 7 bits, which may cause a significant signaling overhead.

To reduce the signaling overhead, the scheme 500 limits the number of allowable gap periods 506 within a scheduled period 202 and/or the duration of a gap period 506. In an embodiment, the scheme 500 allows one gap period 506 of one symbol duration within a scheduled period 202 or within a certain period of about 5 millisecond (ms). For a 30 kHz subcarrier spacing (SCS) configuration, a one symbol gap period 506 may correspond to about 25 microsecond (µs).

In an embodiment, the scheme 500 restricts the location of a gap period 506 within a scheduled period 202. For example, a gap period 506 of about one symbol duration is allowed at the start (e.g., a beginning symbol) of a transmission slot 204 or at the end (e.g., a last symbol) of a transmission slot 204. The scheme 500 may further restrict the location of the gap period 506 based on the usage of the gap period 506. For example, when the gap period 506 is configured for a PDCCH monitoring occasion, the scheme 500 limits the gap period 506 to be located within the last few transmission slots 204 of the scheduled period 202. In some examples, the gap indicator 530 may further indicate a usage of the gap period 506.

The scheme 500 may further limit the gap period 506 to be located at the beginning of the last transmission slot 204 of the scheduled period 202 as shown in FIG. 5. Thus, the gap indicator 530 can include a length of about one bit indicating whether a gap period 506 is present at the beginning of a last transmission slot 204 of the scheduled period 202. For example, when the gap indicator 530 includes a bit value of 1, the scheduled period 202 includes a gap period 506 at the beginning of the last transmission slot 204. Conversely, when the gap indicator 530 includes a bit value of 0, the scheduled period 202 does not include a gap period 506 at the beginning of the last transmission slot 204. In some other embodiments, the signaling overhead or the number of bits required for signaling the gap period 506 may be further reduced by including partial gap configuration information in an RRC message, as described in greater detail herein.

Upon receiving the UL scheduling grant 520, the UE may transmit UL communication signals 210 during the transmission slots 204 according to transmission parameters provided by the UL scheduling grant 520. The UE may refrain from transmitting during the configured gap period 506. In other words, the UE may include a silence period in the UL communication signal 210c transmitted in the last transmission slot 204, where the silence period corresponds to the gap period 506. The UE may rate-match around the gap period 506 when generating the UL communication signal 210c or punctured the portion of the UL communication signal 210c corresponding to the gap period 506. Rate-matching may provide a better performance than puncturing. However, for rate-matching, the UE may require to be notified of the gap period 506 in advance so that the UE can generate the UL communication signal 210c based on the number of available symbols or transmission. In some examples, the UE may determine whether to apply rate-matching or puncturing based on the amount of time between when the UE is notified of the gap period 506 and the start of the gap period 506. In some other examples, the UE may apply puncturing for all gap periods 506.

The inclusion of the gap period 506 in a scheduled period 202 may also lead to the requirement of LBTs. For example, the UE may perform no LBT or a category 2 (CAT2) LBT prior to a UL transmission when the UL transmission is after a gap period 506. The CAT2 LBT may be referred to as a one-shot LBT, where no random backoff is included. In an embodiment, the UE may always perform a CAT2 LBT prior to a UL transmission when the UL transmission is after a gap period 506. In an embodiment, the BS may configure the UE with an LBT type for performing LBT after a gap period 506 vian RRC configuration. In an embodiment, the BS may include an LBT type indicator 532 in the UL scheduling grant 520 to indicate whether the UE can perform no LBT or a CAT2 LBT 540 before transmitting the UL communication signal 210c after the gap period 506. In some embodiments, the LBT type indicator 532 can be jointly coded with the gap indicator 530 and/or the resource allocation for the UL transmissions 210. For example, the UL scheduling grant 520 may indicate a starting offset (e.g., a symbol offset from the start of a transmission slot 204) for a UL transmission. When the starting offset is greater than a certain symbol offset (e.g., a K symbol offset), the a CAT2 LBT 540 is required. Otherwise, no LBT is required prior to the UL transmission.

In some embodiments, the LBT type may be dependent on whether the UE was able to transmit before the gap period 506 or not. For example, when the UE is able to transmit before the gap period 506, the UE may transmit the UL communication signal 210c without performing an LBT. Conversely, when the UE was unable to transmit before the gap period 506, the UE is required to perform an LBT 540 prior to transmitting the UL communication signal 210c independent of the LBT type indicator 532 and/or the LBT type configured by an RRC configuration. In other words, the UE may overwrite the LBT type configured by the BS.

In some embodiments, the LBT type determination may also impact the duration of the gap period 506. For example, the BS may configure a longer gap period 506 when the LBT type is a CAT2 LBT to account for the duration 508 of the CAT2 LBT 540. The duration 508 may vary depending on the embodiments. In some examples, the CAT2 LBT 540 may require about a duration 508 of about 25 µs. In other words, when no LBT is required for the gap period 506, the BS may configure a duration of X for the gap period 506. When a CAT2 LBT 540 is required for the gap period 506, the BS may configure a duration of X+25 µs for the gap period 506 to account for the duration 508.

Figure 6:
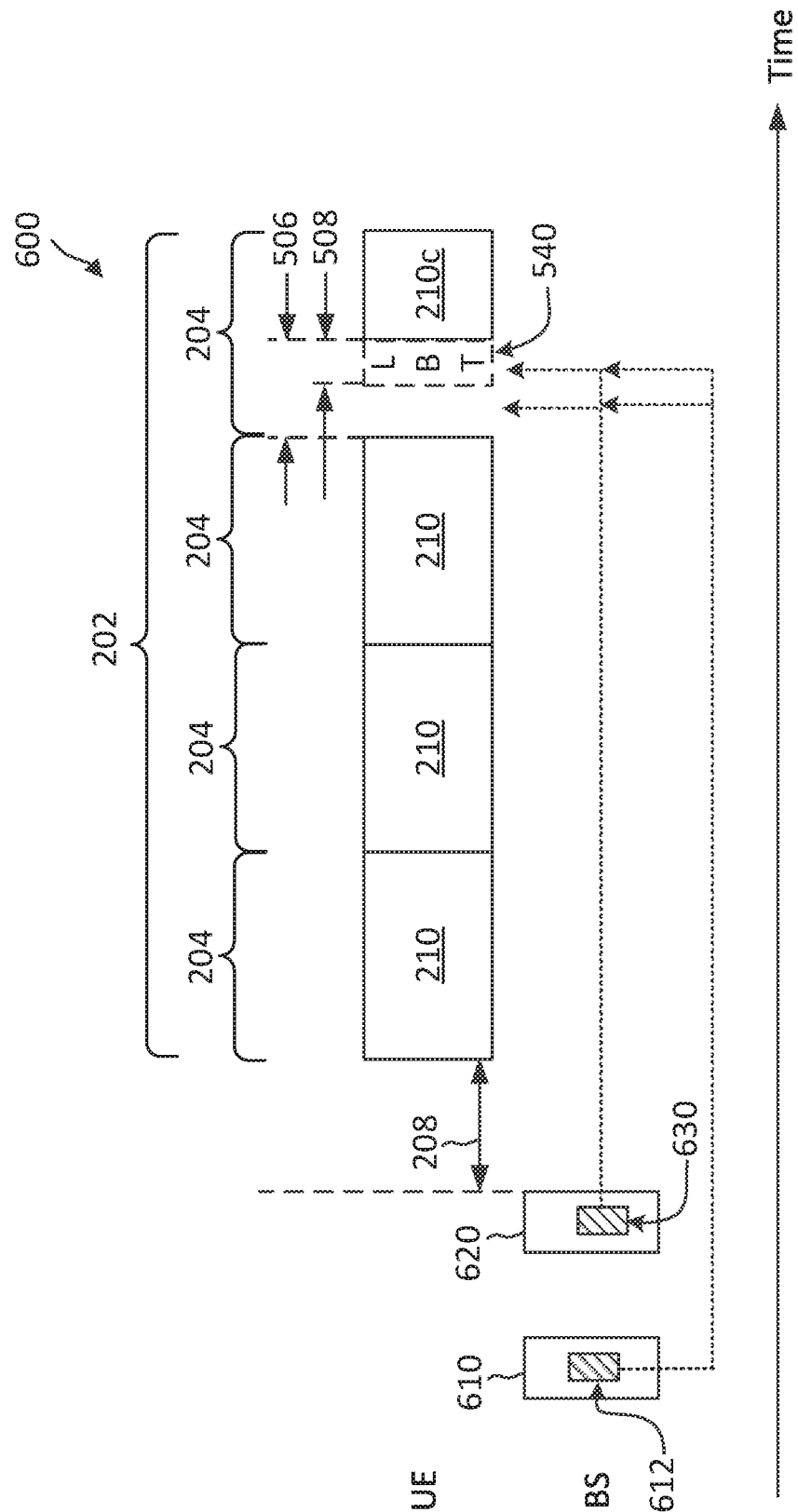
FIG. 6 is a timing diagram illustrating a transmission scheme with multi-TTI grants and gap and/or LBT type signaling according to some embodiments of the present disclosure.

FIG. 6 is a timing diagram illustrating a transmission scheme 600 with multi-TTI grants and gap and/or LBT type signaling according to some embodiments of the present disclosure. The scheme 600 is described using a substantially similar allocation configuration as the scheme 500 and may use the same reference numerals as in FIGS. 2 and 5 for simplicity's sake. The scheme 600 is substantially similar to the scheme 500, but signals partial gap and/or LBT information 612 in an RRC message 610 to reduce signaling overhead in the PDCCH. As shown, the BS transmits the RRC message 610 to preconfigure the UE with the partial gap and/or LBT information 612.

In an embodiment, the information 612 may include an RRC table indicating multiple allowable gap configurations. For example, the RRC table may include M entries. Each entry may indicate a location (e.g., symbol number) and/or a duration of the gap period 506. Similar to the scheme 500, the BS may transmit a UL scheduling grant 620 to the UE indicating a multi-TTI allocation (e.g., a scheduled period 202 including multiple transmission slots 204) and a gap indicator 630. However, the gap indicator 630 may indicate an index into the RRC table entry for the gap period 506 instead of the actual symbol location and/or duration of the gap period 506. As an example, M may be about 7, and thus the gap indicator 630 may require about 3 bits to indicate an RRC table index for the gap period 506.

In some other embodiments, the BS may configure the UE to leave a gap period 506 at a given symbol location within the scheduled period 202 via the RRC information 612. The RRC configuration may be a semi-static configuration. In such embodiments, the UL scheduling grant 620 may not include the gap indicator 630.

In some embodiments, the BS may also indicate the LBT type associated with the gap period 506 via an RRC configuration. For example, the RRC information 612 may indicate a no LBT mode or a CAT2 LBT 540 after the gap period 506.

Figure 7:
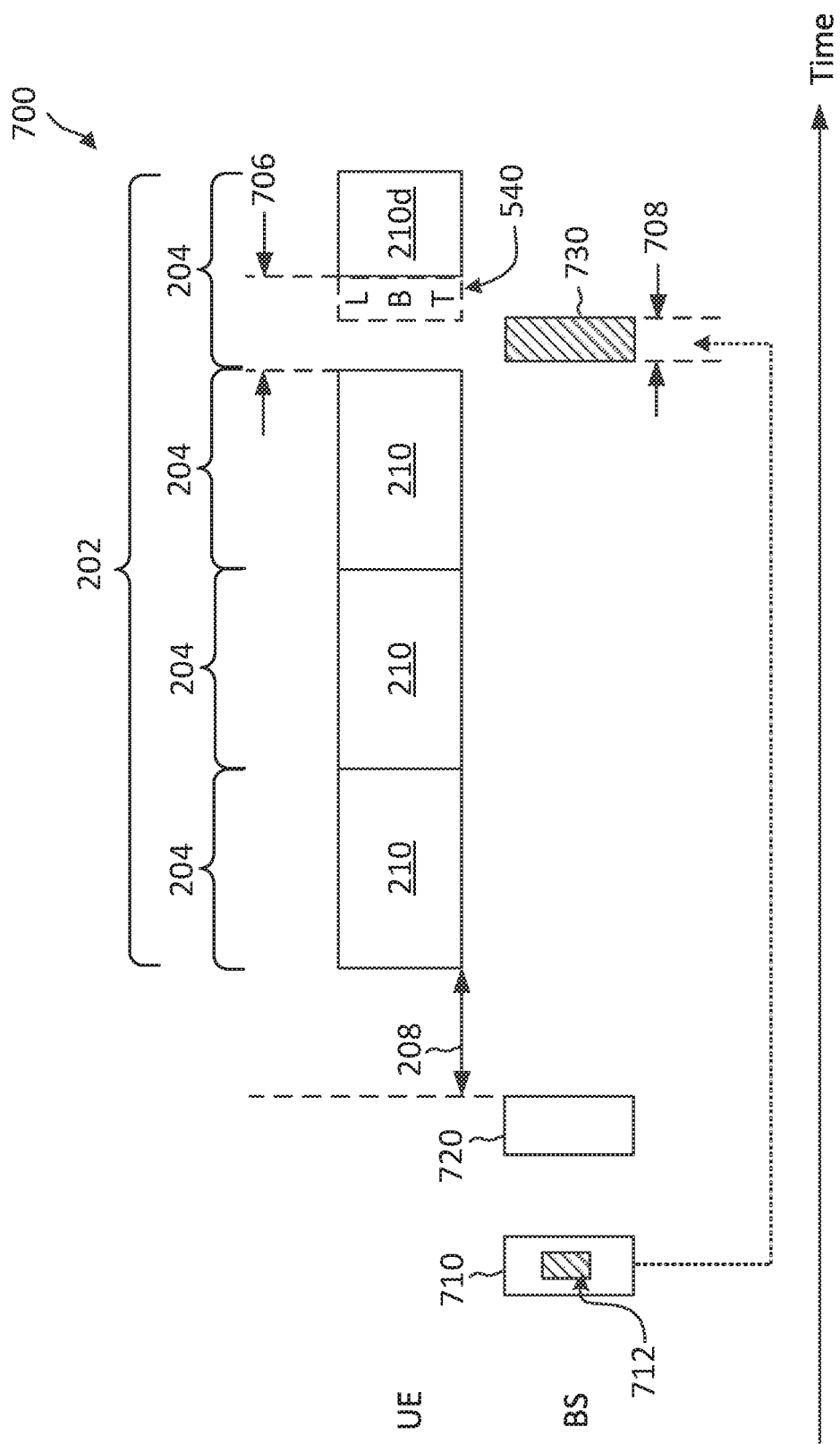
FIG. 7 is a timing diagram illustrating a transmission scheme with multi-TTI grants and gap and/or LBT type signaling according to some embodiments of the present disclosure.

FIG. 7 is a timing diagram illustrating a transmission scheme 700 with multi-TTI grants and gap and/or LBT type signaling according to some embodiments of the present disclosure. The scheme 700 is described using a substantially similar allocation configuration as the schemes 500 and 600 and may use the same reference numerals as in FIGS. 2 and 5 for simplicity's sake. The scheme 700 illustrates the inclusion of a gap period 706 in a scheduled period 202 to allow for DRS transmissions by the BS and/or random access preamble transmissions by another UE. As shown, the BS transmits an RRC message 710. The RRC message 710 may include configuration information 712 indicating a preconfigured allocation 730. The RRC message 710 may be carried in a broadcast system information signal. In an embodiment, the preconfigured allocation 730 may be a DRS transmission configuration (e.g., a DRS schedule). For example, the BS may transmit DRSs to facilitate initial network access and network synchronization periodically (e.g., at a periodicity of about 40 ms) according to a predetermined schedule. A DRS may include a PSS, a SSS, a PBCH signal, a MIB, and/or a SIB and may be in the form of SSBs. In another embodiment, the preconfigured allocation 730 may be a random access resource configuration. The BS may allocate resources for random access preamble transmission so that a UE desiring to join the network may transmit a random access preamble to the BS using the random access resource.

In the scheme 700, the UE may monitor for broadcast system information from the BS based on DRS occasions or a predetermined schedule. The UE may also monitor for PDCCH DCI or scheduling information from the BS according to PDCCH monitoring occasions configured by the BS. Similar to the schemes 500 and 600, the BS may transmit a UL scheduling grant 720 to the UE indicating a scheduled period 202 including multiple transmission slots 204. However, instead of including a gap indicator, such as the gap indicator 530 and 630, in the UL scheduling grant 720, a gap period 706 may autonomously be created based on the configuration information 712. In other words, when the scheduled period 202 includes a period 706 overlapping with an allocation (e.g., a period 708) preconfigured by the RRC configuration information 712, the UE may leave a transmission gap during the period 706 when transmitting the UL communication signal 210d. For example, when the UE detected the preconfigured period 708 (e.g., corresponding to a DRS schedule or a random access resource from system information monitoring), the UE may not transmit during the period 708. The UE may generate the UL communication signal 210d including a silence period 706 corresponding to the preconfigured period 708 based on puncturing or rate-matching around the preconfigured period 708.

In an embodiment, the BS may include an LBT type indicator (e.g., the LBT type indicator 532) in the UL scheduling grant 720. In an embodiment, the BS may include an LBT type indicator (e.g., the configuration information 612) in the RRC message 710 or in another RRC message. The UE may determine whether to perform a CAT2 LBT 540 prior to transmitting the UL communication signal 210c based on the LBT type indicator.

Figure 8:
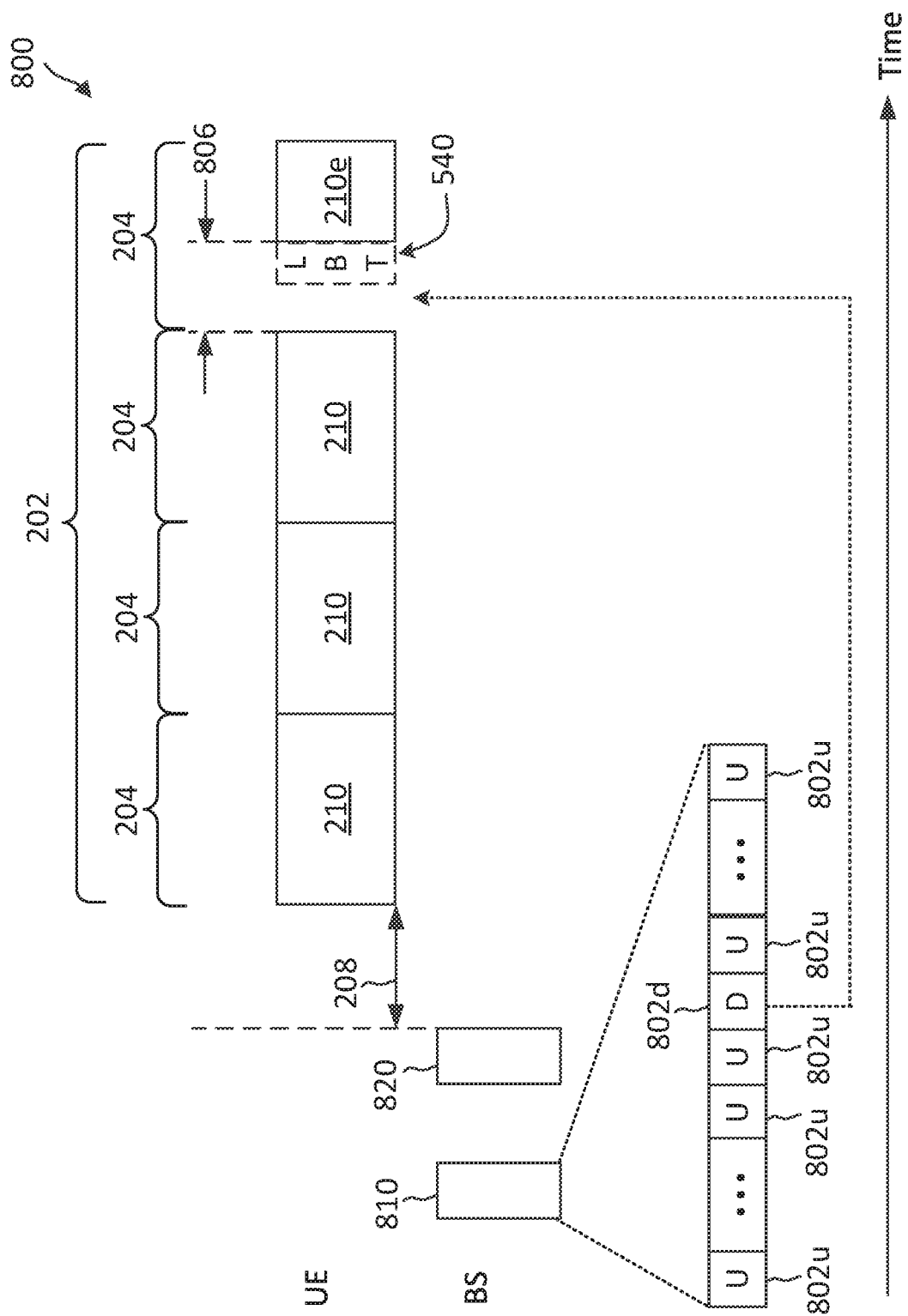
FIG. 8 is a timing diagram illustrating a transmission scheme with multi-TTI grants and gap and/or LBT type signaling according to some embodiments of the present disclosure.

FIG. 8 is a timing diagram illustrating a transmission scheme 800 with multi-TTI grants and gap and/or LBT type signaling according to some embodiments of the present disclosure. The scheme 800 is described using a substantially similar allocation configuration as the schemes 500, 600, and 700 and may use the same reference numerals as in FIGS. 2 and 5 for simplicity's sake. For example, a BS transmits a UL scheduling grant 820 to a UE indicating a scheduled period 202 including multiple transmission slots 204. However, the scheme 800 indicates the inclusion of a gap period 806 in the scheduled period 202 based on an SFI 810. As shown, the BS transmits an SFI 810, for example, in the form of a DCI in a PDCCH. The SFI 810 indicates whether a symbol in a certain period is configured for UL communication, DL communication, or flexible (e.g., either UL or DL communication). For example, the SFI 810 may indicate that the scheduled period 202 includes a plurality of symbols 802u configured for UL communication (shown as U) and a symbol 802d configured for DL communication (shown as D).

In an embodiment, the BS may configure the UE, for example, via an RRC configuration, a DCI message, or the UL scheduling grant 820, to leave a gap period 806 when the SFI 810 indicates a DL symbol 802d within the scheduled period 202. The UE may monitor for SFI and PDCCH from the BS. The UE may receive the SFI 810 and the UL scheduling grant 820. The UE may detect that a symbol 802d within the last transmission slot 204 is configured for DL communication based on the received SFI 810. Thus, when the UE transmits the UL communication signal 210e in the last transmission slot 204 including the symbol 802d, the UE may rate-match around the symbol 802d (e.g., the period 806) or apply puncturing to create a silence period during the period 806. While FIG. 8 illustrates a single symbol 802d configured for DL communication in the scheduled period 202, the SFI 810 can indicate any suitable number of DL symbols, contiguous in time or spaced apart in time within the scheduled period 202.

In some other embodiments, the BS may configure the UE, for example, via an RRC configuration, a DCI message, or the UL scheduling grant 820, to drop the UL transmission when the scheduled transmission slot 204 includes a DL symbol 802d. In other words, the UE may not transmit the UL communication signal 210e in the last transmission slot due to the presence of the of the DL symbol 802d.

In another embodiment, the BS may configure the UE, for example, via an RRC configuration, a DCI message, or the UL scheduling grant 820, to ignore the DL symbol 802d configured by the SFI 810 and use the DL symbol 802d for UL communication as scheduled by the UL scheduling grant 820. In other words, the UE may transmit the UL communication signal 210e in the last transmission slot without leaving a gap during the DL symbol 802d.

In an embodiment, the BS may include an LBT type indicator (e.g., the LBT type indicator 532) in the UL scheduling grant 820. In an embodiment, the BS may include an LBT type indicator (e.g., the configuration information 612) in an RRC message. The UE may determine whether to perform a CAT2 LBT 540 prior to transmitting the UL communication signal 210e based on the LBT type indicator. In some other embodiment, the UE may determine that no LBT is needed when the gap period 806 is used for DL communication.

In some embodiments, a BS may employ any suitable combination of the schemes 500, 600, 700, and 800 to configure a UE with multi-TTI UL grants and may include one or more gap periods (e.g., the periods 506, 706, and 806) within a multi-TTI scheduled period (e.g., the scheduled period 202). The BS may also indicate a usage of the gap period in a multi-TTI scheduling grant, for example, whether the gap period is used for PDCCH transmission, and the UE may determine whether an LBT is needed after the gap period based on the gap usage. In some embodiments, the UE may determine that the gap period is configured for UL communication by another UE based on an SFI (e.g., the SFI 810) indicating UL symbols in the gap period. In such embodiments, the UE may perform a CAT2 LBT (e.g., the LBT 540) prior to transmitting after the gap period.

Figure 9:
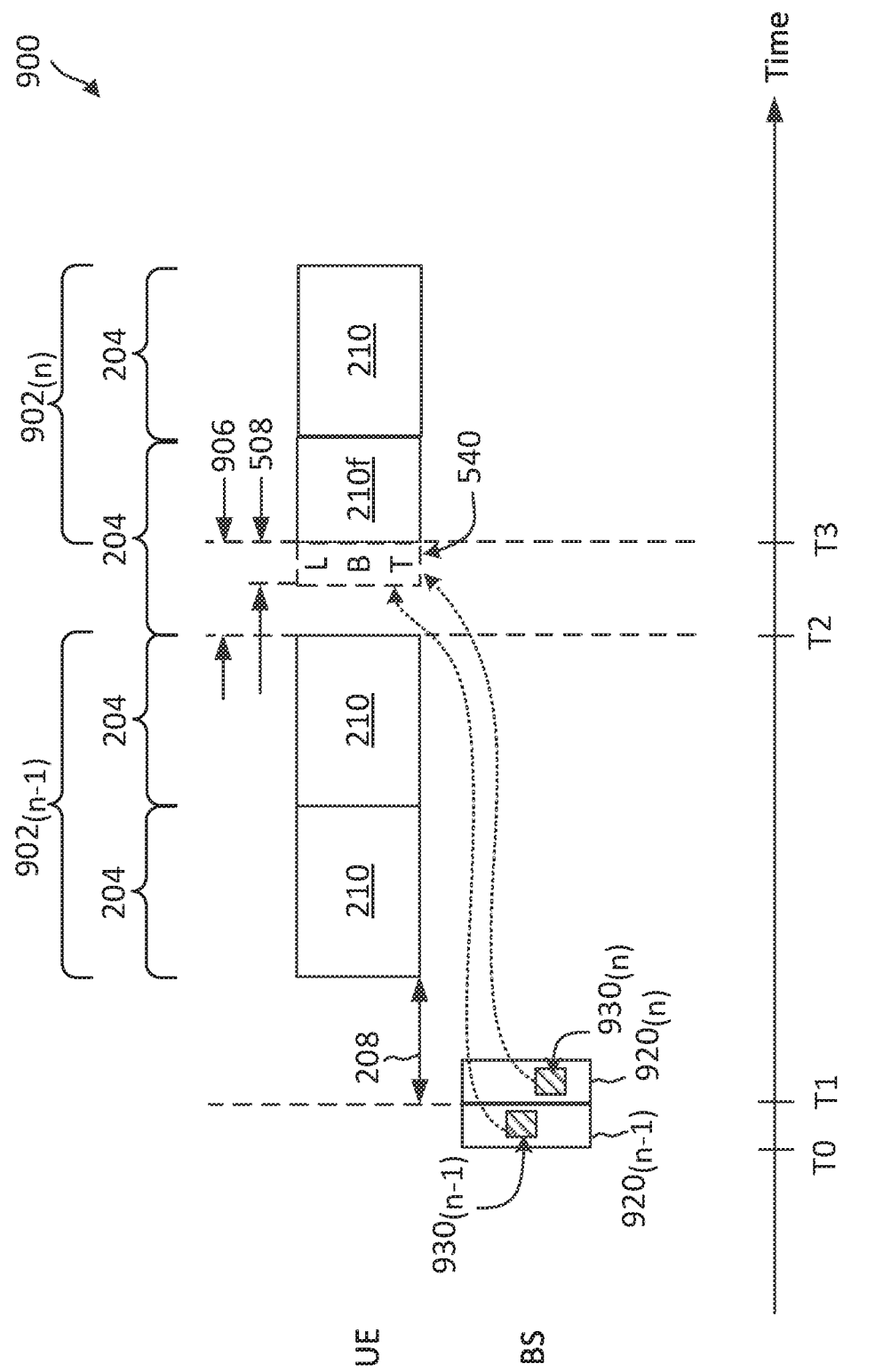
FIG. 9 is a timing diagram illustrating a transmission scheme with back-to-back grants and gap and/or LBT type signaling according to some embodiments of the present disclosure.
Figure 10:
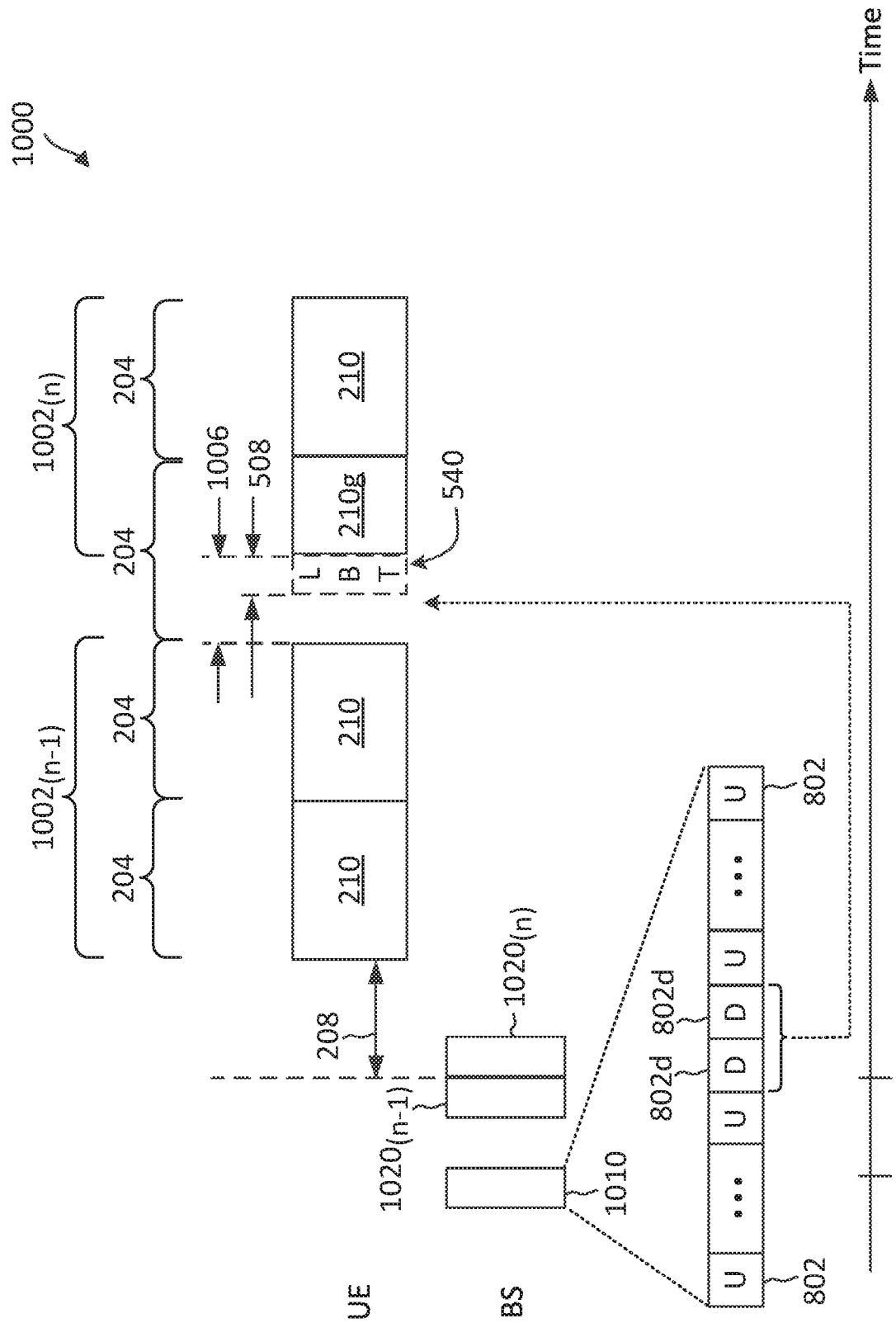
FIG. 10 is a timing diagram illustrating a transmission scheme with back-to-back grants and gap and/or LBT type signaling according to some embodiments of the present disclosure.
Figure 11:
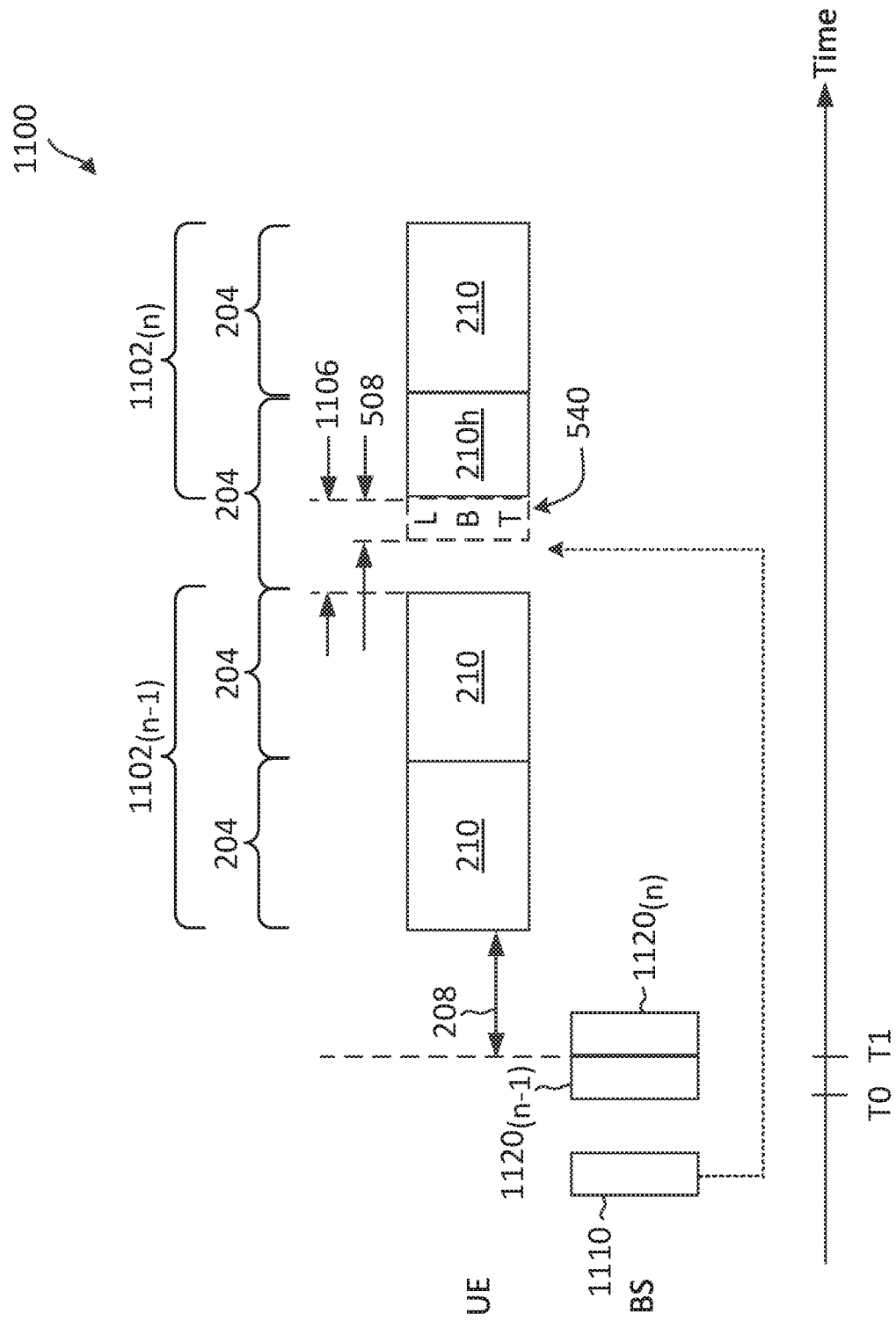
FIG. 11 is a timing diagram illustrating a transmission scheme with back-to-back grants and gap and/or LBT type signaling according to some embodiments of the present disclosure.

FIGS. 9-11 illustrate various mechanisms for signaling back-to-back UL grants with gap periods and/or associated LBT types. In FIGS. 9-11, the schemes 900-1100 may be employed by BSs such as the BSs 105 and 400 and UEs such as the UEs 115 and 300 in a network such as the network 100. In particular, a BS may employ the schemes 900, 1000, and/or 1100 to configure a UE with back-to-back UL allocations and create gap periods between the back-to-back allocations. The schemes 900-1100 are suitable for use in a network operating over a shared spectrum and/or an unlicensed spectrum. The gap periods provide opportunities for other wireless communication devices (e.g., BSs and/or UEs) to access the spectrum, while maintaining a minimal LBT overhead for UL communications. Additionally, the x-axes represent time in some constant units. Further, FIGS. 9-11 may use the same reference numerals as in FIG. 2 to illustrate TTIs and UL transmissions for simplicity's sake.

FIG. 9 is a timing diagram illustrating a transmission scheme 900 with back-to-back grants and gap and/or LBT type signaling according to some embodiments of the present disclosure. In the scheme 900, a BS may configure a UE with independent back-to-back scheduling grants to create gap periods among the consecutive or back-to-back allocations. Similar to the schemes 500-800, the gap periods allow for other communications, such as DL control signaling, DRS, and/or random access preamble transmissions.

At time T0, the BS transmits a UL scheduling grant $920_{(n-1)}$ to the UE indicating a scheduled period $902_{(n-1)}$. At time T1, the BS transmits another UL scheduling grant $920_{(n)}$ to the UE indicating a scheduled period $902_{(n)}$. The BS may transmit the UL scheduling grants $920_{(n-1)}$ and $920_{(n)}$ in advance of corresponding scheduled periods $902_{(n-1)}$ and $902_{(n)}$, for example, by at least a duration 208 to account for the UE's processing delay. The BS may create a gap period 906 between the scheduled periods $902_{(n-1)}$ and $902_{(n)}$ with the consecutive or back-to-back UL scheduling grants $920_{(n-1)}$ and $920_{(n)}$. The BS may transmit the UL scheduling grants $920_{(n-1)}$ and $920_{(n)}$ in the form of two independent DCI over a PDCCH.

While FIG. 9 illustrates each of the scheduled period $902_{(n-1)}$ and $902_{(n)}$ including two transmission slots 204, the scheduled periods $902_{(n-1)}$ and $902_{(n)}$ can include a greater number of transmission slots 204 or a fewer number of transmission slots 204. In some examples, the UL scheduling grants $920_{(n-1)}$ and $920_{(n)}$ can be back-to-back single slot grants. In addition, while FIG. 9 illustrates the UL scheduling grants $920_{(n-1)}$ and $920_{(n)}$ transmitted in adjacent time periods, in some instances, the UL scheduling grants $920_{(n-1)}$ and $920_{(n)}$ can be time periods that are spaced apart or during the same time period using different frequency resources (e.g., carried by a PDCCH signal).

Similar to the schemes 200 and 500-800, each of the scheduling grants UL scheduling grants $920_{(n-1)}$ and $920_{(n)}$ may indicate allocated resources (e.g., corresponding transmission slots 204) and transmission parameters (e.g., MCSs) for the UE to transmit UL communication signals 210. The scheduling grant $920_{(n)}$ may indicate a starting symbol offset for the UL communication signal 210f scheduled in the transmission slot 204 following the gap period 906. Each of the UL scheduling grants $920_{(n-1)}$ and $920_{(n)}$ may additionally include an LBT type indicator $930_{(n-1)}$ and $930_{(n)}$, respectively. However, in the scheme 900, the UE may determine an LBT type (e.g., no LBT or a CAT2 LBT) for a current UL transmission based on a previous UL scheduling grant, a current UL scheduling grant, and/or a UL transmission status in a previous scheduled period.

In an embodiment, the LBT type indicator $930_{(n-1)}$ in the UL scheduling grants $920_{(n-1)}$ may indicate a rule for determining an LBT type for a UL transmission in a next scheduling period $902_{(n)}$. For example, the LBT type indicator $930_{(n-1)}$ may indicate that the UE is not required to perform an LBT prior to a transmission in the next scheduled period $902_{(n)}$ when the gap period 906 between the scheduled periods $902_{(n-1)}$ and $902_{(n)}$ is less than a certain duration X. Otherwise, the UE is required to perform an LBT according to the LBT type indicator $930(n)$ in the next UL scheduling grant $920_{(n)}$. Thus, upon receiving the UL scheduling grant $920_{(n)}$, the UE may determine an end time (e.g., time T2) of the previous scheduled period $902_{(n-1)}$ based on the previous scheduling grant $920_{(n-1)}$ and a start time (e.g., time T3) of the current scheduled period $902_{(n)}$ based on the current scheduling grant $920_{(n)}$. The UE may determine a duration of the gap period 906 between the previous scheduled period $902_{(n-1)}$ and the current scheduled period $902_{(n)}$. If the gap duration is greater than the duration X, the UE may transmit the UL communication signal 210f without performing an LBT prior to the transmission. However, if the gap duration exceeds the duration X, the UE determines whether to perform an LBT prior to transmitting the UL communication signal 210f based on the LBT type indicator $930(n)$ in the current scheduling grant $920_{(n)}$. For example, when the indicates no LBT, the UE may transmit the UL communication signal 210f without performing an LBT. When the indicates a CAT2 LBT 540, the UE may perform a CAT2 LBT 540. When the LBT 540 passes, the UE transmits the UL communication signal 210f When the LBT 540 fails, the UE may refrain from transmitting the UL communication signal 210f.

In an embodiment, the UE may determine an LBT type for a current transmission based on a transmission status before the gap period 906. For example, upon receiving the scheduling grant $920_{(n)}$, the UE may determine whether the UL transmission in the previous scheduled period $902_{(n-1)}$ prior to the gap period 906 was successful or not. When the UE is able to transmit in the previous scheduled period $902_{(n-1)}$, the UE may transmit the UL communication signal 210f without performing an LBT. However, when the UE fails to transmit in the previous scheduled period $902_{(n-1)}$, the UE performs an LBT 540 prior to transmitting the UL communication signal 210f independent of the LBT type indicator $930_{(n-1)}$ in the previous scheduling grant $920_{(n-1)}$ or the LBT type indicator $930_{(n)}$ in the current scheduling grant $920_{(n)}$.

In an embodiment, the LBT type indicator $930_{(n)}$ in the UL scheduling grants $920_{(n)}$ may indicate that the UE is not required to perform an LBT when the transmission in the current scheduled period $902_{(n)}$ is within a certain duration or a certain number of symbols. Otherwise, the UE is required to perform an LBT 540 prior to transmitting in the current scheduled period $902_{(n)}$.

In some other embodiments, the UE may always perform a CAT2 LBT 540 prior to a UL transmission after a gap period 906.

In an embodiment, an LBT type indicator 930 can be jointly coded with a corresponding resource allocation. For example, the UL scheduling grant 920 may indicate a starting offset (e.g., a symbol offset from the start of a transmission slot 204) for a UL transmission. When the starting offset is greater than a certain symbol offset (e.g., a K symbol offset), the a CAT2 LBT 540 is required. Otherwise, no LBT is required prior to the UL transmission.

In an embodiment, the back-to-back scheduling grants $920_{(n-1)}$ and $920_{(n)}$ may be associated by including an association or link in the scheduling grant $920_{(n-1)}$ or the scheduling grant $920_{(n)}$. The association may allow the UE to determine an LBT mode using information provided by the scheduling grant $920_{(n-1)}$ and/or the scheduling grant $920_{(n)}$. In an example, the UE may determine that no LBT is required when the UE transmit in the scheduled periods $902_{(n-1)}$ and $902_{(n)}$ granted by the scheduling grants $920_{(n-1)}$ and $920_{(n)}$, respectively.

In general, the UE may determine an LBT type for a current transmission based on information spread across a previous scheduling grant $920_{(n-1)}$ and a current scheduling grant $920_{(n)}$. For example, the UE may determine an LBT type for a current transmission based on an end time of a previous scheduling period $902_{(n-1)}$, a start time of a current scheduling period $902_{(n)}$, an LBT type indicator $930_{(n-1)}$ in the previous scheduling grant $920_{(n-1)}$, an LBT type indicator $930_{(n)}$ in the current scheduling grant $920_{(n)}$, and/or a transmission status in a previous scheduling period $902_{(n-1)}$.

Similar to the schemes 500-800, the BS may configure a duration of X for the gap period 906 when no LBT is required after the gap period 906. However, when a CAT2 LBT 540 is required after the gap period 906, the BS may configure a duration of X+Y for the gap period 906, where Y may account for the LBT 540 (e.g., Y can be about 25 µs).

FIG. 10 is a timing diagram illustrating a transmission scheme 1000 with back-to-back grants and gap and/or LBT type signaling according to some embodiments of the present disclosure. The scheme 1000 is described using a substantially similar allocation configuration as the scheme 900. For example, at time T0, a BS transmits a UL scheduling grant $1020_{(n-1)}$ indicating a scheduled period $1002_{(n-1)}$. At time T, the BS transmits another UL scheduling grant $1020_{(n)}$ indicating a scheduled period $1002_{(n)}$ spaced apart from the previous scheduling period $1002_{(n)}$ by a gap period 1006. However, the BS may additionally transmit an SFI 1010. The UL scheduling grants 1020 and the SFI 1010 may be similar to the UL scheduling grants 920 and the SFI 810, respectively. As shown, the SFI 1010 indicates that the gap period 1006 includes a plurality of symbols 802d (shown as D) configured for DL communication.

In an embodiment, when the UE detects the gap period 1006 before the scheduling period $1002_{(n)}$ (e.g., based on the end time of the scheduling period $1002_{(n-1)}$ and the start time of the scheduling period $1002_{(n)}$), the UE may transmit a UL communication signal 210g by applying rate-match or puncturing according to the to the gap period 1006.

In an embodiment, when the UE determines that the gap period 1006 between the back-to-back grants 1020 includes DL symbols 802d based on the SFI 1010, the UE may transmit the UL communication signal 210g with no LBT. However, when the UE determines that the gap period 1006 includes UL symbols 802u (e.g., assigned to another UE), the UE may perform a CAT2 LBT 540 prior to transmitting the UL communication signal 210g. In general, the UE may determine an LBT type based on a usage (e.g., PDCCH, DRS, and/or random access) of the gap period 1006 as describe above.

In some other embodiments, the BS may configure the UE, for example, via an RRC configuration, a DCI message, or the UL scheduling grant 1020, to drop the UL transmission when the scheduled transmission slot 204 includes a DL symbol 802d. In other words, the UE may not transmit the UL communication signal 210g in the last transmission slot due to the presence of the of the DL symbol 802d.

In another embodiment, the BS may configure the UE, for example, via an RRC configuration, a DCI message, or the UL scheduling grant 1020, to ignore the DL symbol 802d configured by the SFI 1010 and use the DL symbol 802d for UL communication as scheduled by the UL scheduling grant 1020. In other words, the UE may transmit the UL communication signal 210g in the last transmission slot without leaving a gap during the DL symbol 802d.

In an embodiment, the BS may include an LBT type indicator (e.g., the LBT type indicator 532) in the UL scheduling grant 1020. In an embodiment, the BS may include an LBT type indicator (e.g., the configuration information 612) in an RRC message (e.g., the RRC message 610). The UE may determine whether to perform a CAT2 LBT 540 prior to transmitting the UL communication signal 210c based on the LBT type indicator. In some other embodiment, the UE may determine that no LBT is needed when the gap period 1006 is used for DL communication.

FIG. 11 is a timing diagram illustrating a transmission scheme 1100 with back-to-back grants and gap and/or LBT type signaling according to some embodiments of the present disclosure. The scheme 1000 is described using a substantially similar allocation configuration as the scheme and/or 1000. For example, at time T0, a BS transmits a UL scheduling grant $1120_{(n-1)}$ indicating a scheduled period $1102_{(n-1)}$. At time T1, the BS transmits another UL scheduling grant $1120_{(n)}$ indicating a scheduled period $1102_{(n)}$ spaced apart from the previous scheduling period $1102_{(n)}$ by a gap period 1106. However, the BS may additionally transmit a common control message 1110 indicating the gap period 1106. The UL scheduling grants 1120 may be similar to the UL scheduling grants 920 and 1020. The common control message 1110 may be referred to as a common PDCCH that is destined for multiple UEs. Thus, when a UE receives the UL scheduling grant $1120_{(n)}$ is assigned to the UE, the UE may transmit a UL communication signal 210h including a silence period (e.g., via rate-match or puncturing) corresponding to the gap period 1106 indicated by the common control message 1110.

In some embodiments, a BS may employ any suitable combination of the schemes 900, 1000, 11000 to configure back-to-back UL grants and may include a gap period (e.g., the periods 906, 1006, and 1106) between corresponding scheduled periods (e.g., the scheduled periods 902, 1002, and 1102). The UE may determine whether an LBT (e.g., the CAT2 LBT 540) is needed for a transmission after the gap period based on a previous scheduling grant, a current scheduling grant, an SFI, a common PDCCH, a transmission duration in a current scheduled period, and/or an RRC configuration.

Figure 12:
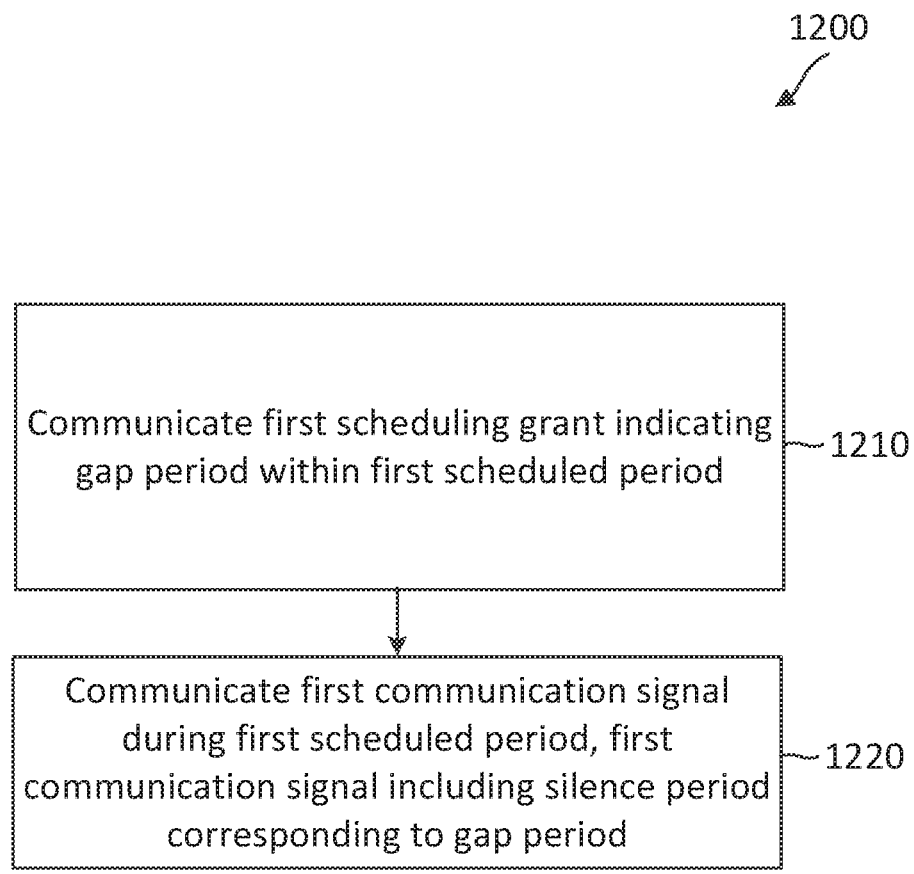
FIG. 12 is a flow diagram of a communication method according to some embodiments of the present disclosure.

FIG. 12 is a flow diagram of a communication method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the communication module 308, the LBT module 309, the transceiver 310, the modem 312, and the one or more antennas 316, to execute the steps of method 1200. In another example, a wireless communication device, such as the BS 105 or BS 400, may utilize one or more components, such as the processor 402, the memory 404, the communication module 408, the LBT module 409, the transceiver 410, the modem 412, and the one or more antennas 416, to execute the steps of method 1200. The method 1200 may employ similar mechanisms as in the schemes 200, 500, 600, 700, and/or 800 as described above with respect to FIGS. 2, 5, 6, 7, and/or 8, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes communicating, by a first wireless communication device with a second wireless communication device, a first scheduling grant (e.g., the scheduling grants 220, 520, and/or 620) indicating a gap period (e.g., the gap periods 206, 506, and/or 606) within a first scheduled period (e.g., the scheduled periods 202).

At step 1220, the method 1200 includes communicating, by the first wireless communication device with the second wireless communication device during the first scheduled period, a first communication signal (e.g., the UL communication signals 210c) including a first silence period corresponding to the gap period.

In an embodiment, the first wireless communication device may correspond to a BS and the second wireless communication device may correspond to a UE. In such an embodiment, the first wireless communication device communicates the first scheduling grant by transmitting the first scheduling grant to the second wireless communication device. The first wireless communication device communicates the first communication signal by receiving the first communication signal from the second wireless communication device.

In an embodiment, the first wireless communication device may correspond to a UE and the second wireless communication device may correspond to a BS. In such an embodiment, the first wireless communication device communicates the first scheduling grant by receiving the first scheduling grant from the second wireless communication device. The first wireless communication device communicates the first communication signal by transmitting the first communication signal to the second wireless communication device.

In an embodiment, the communicating the first scheduling grant includes communicating, by the first wireless communication device with the second wireless communication device, the first scheduling grant identifying the gap period from among a plurality of allowable gap periods within the first scheduled period. The first wireless communication device further communicates, with the second wireless communication device, a configuration message (e.g., the RRC message 610) indicating the plurality of allowable gap periods within the first scheduled period.

In an embodiment, the first scheduled period includes a plurality of transmission slots (e.g., the transmission slots 204) and the gap period is located at a beginning or an end of a first transmission slot of the plurality of transmission slots. The first communication device communicates the first communication signal with the second wireless communication device during a first transmission slot of the plurality of transmission slots. The first communication device communicates a second communication signal with the second wireless communication device during another first transmission slot of the plurality of transmission slots. In an embodiment, the first scheduling grant indicates the gap period is located at the end of the first transmission slot and the first transmission slot is located at an of the first scheduled period. In an embodiment, the first wireless communication device further communicates, with the second wireless communication device during the gap period, a second scheduling grant (e.g., the UL scheduling grants 220, 520, and/or 620) for a second scheduled period after the first scheduled period.

In an embodiment, the first wireless communication device further communicates, with the second wireless communication device, an SFI (e.g., the SFI 810) indicating a downlink period (e.g., the period 806 and the DL symbols 802d) within a second scheduled period. The first wireless communication device further communicates, with the second wireless communication device during the second scheduled period, an UL communication signal (e.g., the UL communication signal 210e) including a second silence period corresponding to the downlink period.

In an embodiment, the first wireless communication device further communicates, with the second wireless communication device, a DRS transmission schedule (e.g., the period 708). The first wireless communication device further communicates, with the second wireless communication device during a second scheduled period (e.g., the scheduled period 202), a second communication signal (e.g., the UL communication signal 210d) including a second silence period (e.g., the period 706) corresponding to a time period during which the DRS transmission schedule overlaps with the second scheduled period.

In an embodiment, the first wireless communication device further communicates, with the second wireless communication device, a configuration indicating a random access resource (e.g., in the period 708). The first wireless communication device further communicates, with the second wireless communication device during a second scheduled period (e.g., the scheduled period 202), a second communication signal (e.g., the UL communication signal 210d) including a second silence period corresponding to a time period during which the random access resource overlaps with the second scheduled period.

In an embodiment, the first wireless communication device communicates the first communication signal by transmitting the first communication signal to second wireless communication device based on an LBT mode (e.g., no LBT or the CAT2 LBT 540). The first wireless communication device determines the LBT mode based on a transmission status of the first wireless communication device in a time period before the first scheduled period. In an embodiment, the first wireless communication device communicates the first scheduling grant by receiving, from the second wireless communication device, the first scheduling grant indicating the LBT mode (e.g., the LBT type indicator 532).

In an embodiment, the first wireless communication device performs at least one of rate-matching or puncturing on the first communication signal based on the gap period.

Figure 13:
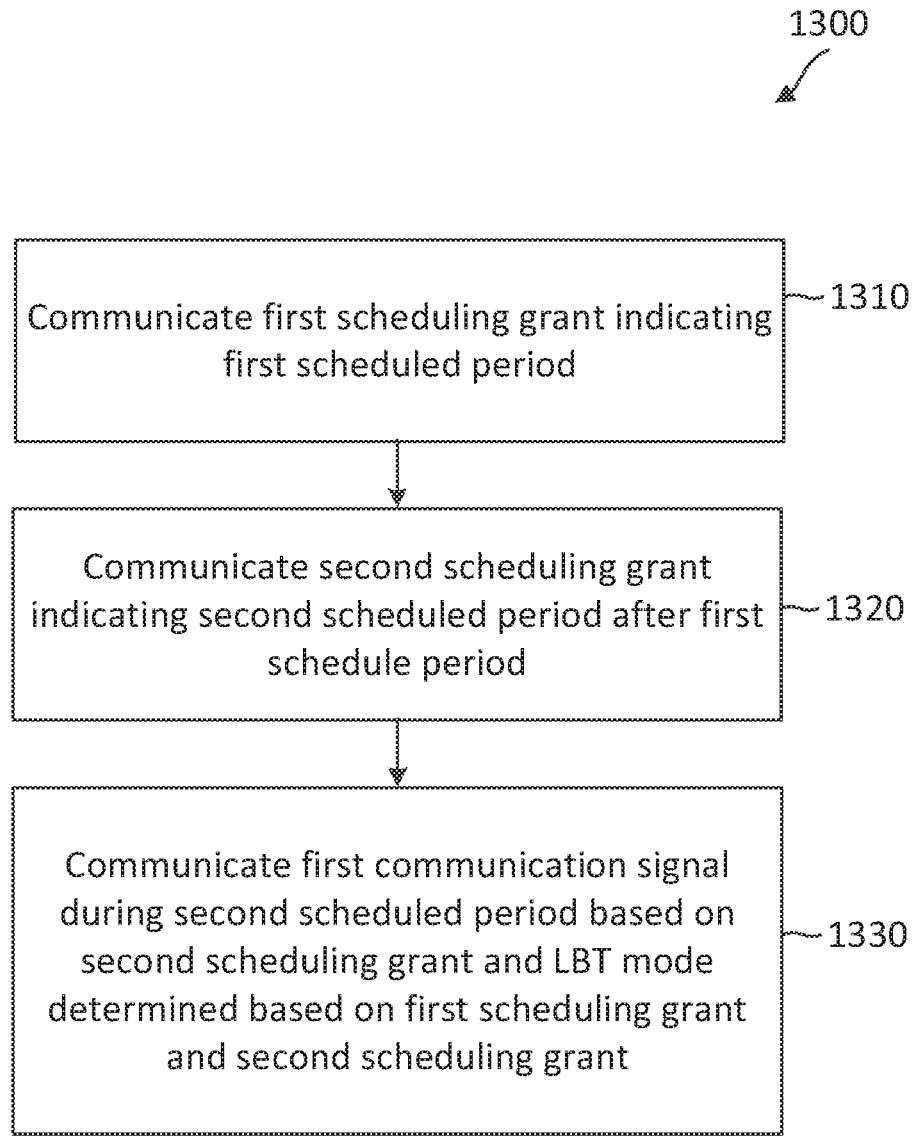
FIG. 13 is a flow diagram of a communication method according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the communication module 308, the LBT module 309, the transceiver 310, the modem 312, and the one or more antennas 316, to execute the steps of method 1300. In another example, a wireless communication device, such as the BS 105 or BS 400, may utilize one or more components, such as the processor 402, the memory 404, the communication module 408, the LBT module 409, the transceiver 410, the modem 412, and the one or more antennas 416, to execute the steps of method 1300. The method 1300 may employ similar mechanisms as in the schemes 900, 1000, and/or 1100 as described above with respect to FIGS. 9, 10, and/or 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes communicating, by a first wireless communication device with a second wireless communication device, a first scheduling grant (e.g., the UL scheduling grant $920_{(n-1)}$, $1020_{(n-1)}$, or $1120_{(n-1)}$) indicating a first scheduled period (e.g., the scheduled period $902_{(n-1)}$, $1002_{(n-1)}$, or $1102_{(n-1)}$).

At step 1320, the method 1300 includes communicating, by the first wireless communication device with the second wireless communication device, a second scheduling grant (e.g., the UL scheduling grant $920_{(n)}$, $1020_{(n)}$, or $1120_{(n)}$) indicating a second scheduled period (e.g., the scheduled period $902_{(n)}$, $1002_{(n)}$, or $1102_{(n)}$) spaced apart from the first scheduled period.

At step 1330, the method 1300 includes communicating, by the first wireless communication device with the second wireless communication device during the second scheduled period, a first communication signal (e.g., the UL communication signal 210f, 210g, or 210h) based on the second scheduling grant and an LBT mode (e.g., no LBT or the CAT2 LBT 540) determined based on the first scheduling grant and the second scheduling grant.

In an embodiment, the first wireless communication device may correspond to a BS and the second wireless communication device may correspond to a UE. In such an embodiment, the first wireless communication device communicates the first and second scheduling grants by transmitting the first and second scheduling grants to the second wireless communication device. The first wireless communication device communicates the first communication signal by receiving the first communication signal from the second wireless communication device.

In an embodiment, the first wireless communication device may correspond to a UE and the second wireless communication device may correspond to a BS. In such an embodiment, the first wireless communication device communicates the first and second scheduling grants by receiving the first and second scheduling grants from the second wireless communication device. The first wireless communication device communicates the first communication signal by transmitting the first communication signal to the second wireless communication device.

In an embodiment, the first scheduling grant indicates a rule (e.g., the LBT type indicator 930) for determining the LBT mode based on a gap period (e.g., the gap periods 906, 1006, and 1106) between the first scheduled period and the second scheduled period.

In an embodiment, the first scheduling grant indicates a rule (e.g., the LBT type indicator 930) for determining the LBT mode based on a transmission status in the first scheduled period before the second scheduled period.

In an embodiment, the second scheduling grant indicates a rule (e.g., the LBT type indicator 930) for determining the LBT mode based on a transmission duration of the first communication signal.

In an embodiment, the first wireless communication device further receives a third scheduling grant (e.g., the scheduled period 1002) from the second wireless communication device indicating a third scheduled period after the second scheduled period. The first wireless communication device receives an SFI (e.g., the SFI 1010) from the second wireless communication device, indicating a downlink period (e.g., the period 1006 and the DL symbols 802d) between the second scheduled period and the third scheduled period. The first wireless communication device further transmits, to the second wireless communication device, a UL communication signal (e.g., the UL communication signal 210g) during the third scheduled period without performing an LBT based on the SFI indicating the downlink period between the second scheduled period and the third scheduled period. The UL communication signal includes a silence period corresponding to the downlink period.

In an embodiment, the first wireless communication device further receives, from the second wireless communication device, a third scheduling grant indicating a third scheduled period after the second scheduled period. The first wireless communication device further receives, from the second wireless communication device, an SFI (e.g., the SFI 1010) indicating an uplink period (e.g., the UL symbols 802u) between the second scheduled period and the third scheduled period. The first wireless communication device further transmits, to the second wireless communication device, a UL communication signal (e.g., the UL communication signal 210g) during the third scheduled period. The first wireless communication device performs an LBT (e.g., the CAT2 LBT 540) before transmitting the UL communication signal based on the SFI indicating the UL period between the second scheduled period and the third scheduled period.

In an embodiment, the first wireless communication device performs at least one of rate-matching or puncturing on the first communication signal based the LBT mode.

In an embodiment, the first wireless communication device transmits a message (e.g., the common control message 1110) indicating a gap period configured for a plurality of wireless communication device including the second wireless communication device, where the gap period is between the first scheduled period and the second scheduled period.

In an embodiment, the first wireless communication device receives a message (e.g., the common control message 1110) indicating a gap period configured for a plurality of wireless communication device including the first wireless communication device, where the gap period is between the first scheduled period and the second scheduled period.

In some embodiments, a BS (e.g., the BSs 105 and 400) may communicate with a UE (e.g., the UEs 115 and 300) using any suitable combination of the schemes 200, 500, 600, 700, 800, 900, 1000, 1100 and the methods 1200 and 1300 described above with respect to FIGS. 2, 5, 6, 7, 8, 9, 10, 11, 12, and 13, respectively.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method includes communicating, by a first wireless communication device with a second wireless communication device, a first scheduling grant indicating a gap period within a first scheduled period. The method also includes communicating, by the first wireless communication device with the second wireless communication device during the first scheduled period, a first communication signal including a first silence period corresponding to the gap period.

In some aspects, the method may also include where the communicating the first scheduling grant includes communicating, by the first wireless communication device with the second wireless communication device, the first scheduling grant identifying the gap period from among a plurality of allowable gap periods within the first scheduled period. The method may also include communicating, by the first wireless communication device with the second wireless communication device, a configuration message indicating the plurality of allowable gap periods within the first scheduled period. The first scheduled period includes a plurality of transmission slots and the gap period is located at a beginning or an end of a first transmission slot of the plurality of transmission slots. The communicating the first communication signal includes communicating, by the first wireless communication device with the second wireless communication device, the first communication signal during the first transmission slot, and where the method may also include communicating, by the first wireless communication device with the second wireless communication device, a second communication signal during a second transmission slot of the plurality of transmission slots, where the first transmission slot is different from the second transmission slot. The method may also include where the first scheduling grant indicates the gap period is located at the end of the first transmission slot; and the first transmission slot is located at an of the first scheduled period. The method may also include communicating, by the first wireless communication device with the second wireless communication device during the gap period, a second scheduling grant for a second scheduled period after the first scheduled period. The method may also include communicating, by the first wireless communication device with the second wireless communication device, a slot format indicator (SFI) indicating a downlink period within a second scheduled period; and communicating, by the first wireless communication device with the second wireless communication device during the second scheduled period, an uplink communication signal including a second silence period corresponding to the downlink period. The method may also include communicating, by the first wireless communication device with the second wireless communication device, a discovery reference signal transmission schedule; and communicating, by the first wireless communication device with the second wireless communication device during a second scheduled period, a second communication signal including a second silence period corresponding to a time period during which the discovery reference signal transmission schedule overlaps with the second scheduled period. The method may also include communicating, by the first wireless communication device with the second wireless communication device, a configuration indicating a random access resource; and communicating, by the first wireless communication device with the second wireless communication device during a second scheduled period, a second communication signal including a second silence period corresponding to a time period during which the random access resource overlaps with the second scheduled period. The communicating the first communication signal includes transmitting, by the first wireless communication device to the second wireless communication device, the first communication signal based on a listen-before-talk (LBT) mode. The method may also include determining, by the first wireless communication device, the LBT mode based on a transmission status of the first wireless communication device in a time period before the first scheduled period. The communicating the first scheduling grant includes receiving, by the first wireless communication device from the second wireless communication device, the first scheduling grant indicating the LBT mode. The method may also include performing, by the first wireless communication device, at least one of rate-matching or puncturing on the first communication signal based on the gap period.

Further embodiments of the present disclosure include a method of wireless communication. The method includes communicating, by a first wireless communication device with a second wireless communication device, a first scheduling grant indicating a first scheduled period. The method also includes communicating, by the first wireless communication device with the second wireless communication device, a second scheduling grant indicating a second scheduled period spaced apart from the first scheduled period. The method also includes communicating, by the first wireless communication device with the second wireless communication device during the second scheduled period, a first communication signal based on the second scheduling grant and a listen-before-talk (LBT) mode determined based on the first scheduling grant and the second scheduling grant.

In some aspects, the method may also include where the first scheduling grant indicates a rule for determining the LBT mode based on a gap period between the first scheduled period and the second scheduled period. The first scheduling grant indicates a rule for determining the LBT mode based on a transmission status in the first scheduled period before the second scheduled period. The second scheduling grant indicates a rule for determining the LBT mode based on a transmission duration of the first communication signal. The method may also include receiving, by the first wireless communication device from the second wireless communication device, a third scheduling grant indicating a third scheduled period after the second scheduled period; receiving, by the first wireless communication device from the second wireless communication device, a slot format indicator (SFI) indicating a downlink period between the second scheduled period and the third scheduled period; and transmitting, by the first wireless communication device to the second wireless communication device, an uplink communication signal during the third scheduled period without performing an LBT based on the SFI indicating the downlink period between the second scheduled period and the third scheduled period. The method may also include receiving, by the first wireless communication device from the second wireless communication device, a third scheduling grant indicating a third scheduled period after the second scheduled period; receiving, by the first wireless communication device from the second wireless communication device, a slot format indicator (SFI) indicating an uplink period between the second scheduled period and the third scheduled period; transmitting, by the first wireless communication device to the second wireless communication device, an uplink communication signal during the third scheduled period; and performing, by the first wireless communication device, an LBT before transmitting the uplink signal based on the SFI indicating the uplink period between the second scheduled period and the third scheduled period. The method may also include performing, by the first wireless communication device, at least one of rate-matching or puncturing on the first communication signal based the LBT mode. The gap period is between the first scheduled period and the second scheduled period. The gap period is between the first scheduled period and the second scheduled period.

Further embodiments of the present disclosure include an apparatus including a transceiver configured to communicate, with a wireless communication device, a first scheduling grant indicating a gap period within a first scheduled period; and communicate, with the wireless communication device during the first scheduled period, a first communication signal including a first silence period corresponding to the gap period.

In some aspects, the apparatus may also include where the first scheduling grant identifies the gap period from among a plurality of allowable gap periods within the first scheduled period. The transceiver is further configured to communicate, with the wireless communication device, a configuration message indicating the plurality of allowable gap periods within the first scheduled period. The first scheduled period includes a plurality of transmission slots and the gap period is located at a beginning or an end of a first transmission slot of the plurality of transmission slots. The transceiver is further configured to communicate, with the wireless communication device, the first communication signal during the first transmission slot; and communicate, with the wireless communication device, a second communication signal during a second transmission slot of the plurality of transmission slots, where the first transmission slot is different from the second transmission slot. The apparatus may also include where first scheduling grant indicates the gap period is located at the end of the first transmission slot; and the first transmission slot is located at an of the first scheduled period. The transceiver is further configured to communicate, with the wireless communication device during the gap period, a second scheduling grant for a second scheduled period after the first scheduled period. The transceiver is further configured to communicate, with the wireless communication device, a slot format indicator (SFI) indicating a downlink period within a second scheduled period; and communicate, with the wireless communication device during the second scheduled period, an uplink communication signal including a second silence period corresponding to the downlink period. The transceiver is further configured to communicate, with the wireless communication device, a discovery reference signal transmission schedule; and communicate, with the wireless communication device during a second scheduled period, a second communication signal including a second silence period corresponding to a time period during which the discovery reference signal transmission schedule overlaps with the second scheduled period. The transceiver is further configured to communicate, with the wireless communication device, a configuration indicating a random access resource; and communicate, with the wireless communication device during a second scheduled period, a second communication signal including a second silence period corresponding to a time period during which the random access resource overlaps with the second scheduled period. The transceiver is further configured to communicate the first communication signal by transmitting, to the wireless communication device, the first communication signal based on a listen-before-talk (LBT) mode. The apparatus may also include a processor configured to determine the LBT mode based on a transmission status of the apparatus in a time period before the first scheduled period. The transceiver is further configured to communicate the first scheduling grant by receiving, from the wireless communication device, the first scheduling grant indicating the LBT mode. The apparatus may also include a processor configured to perform at least one of rate-matching or puncturing on the first communication signal based on the gap period.

Further embodiments of the present disclosure include an apparatus including a transceiver configured to communicate, with a wireless communication device, a first scheduling grant indicating a first scheduled period; communicate, with the wireless communication device, a second scheduling grant indicating a second scheduled period spaced apart from the first scheduled period; and communicate, with the wireless communication device during the second scheduled period, a first communication signal based on the second scheduling grant and a listen-before-talk (LBT) mode determined based on the first scheduling grant and the second scheduling grant.

In some aspects, the apparatus may also include where the first scheduling grant indicates a rule for determining the LBT mode based on a gap period between the first scheduled period and the second scheduled period. The first scheduling grant indicates a rule for determining the LBT mode based on a transmission status in the first scheduled period before the second scheduled period. The second scheduling grant indicates a rule for determining the LBT mode based on a transmission duration of the first communication signal. The transceiver is further configured to receive, from the wireless communication device, a third scheduling grant indicating a third scheduled period after the second scheduled period; receive, from the wireless communication device, a slot format indicator (SFI) indicating a downlink period between the second scheduled period and the third scheduled period; and transmit, the wireless communication device, an uplink communication signal during the third scheduled period without performing an LBT based on the SFI indicating the downlink period between the second scheduled period and the third scheduled period. The transceiver is further configured to receive, from the wireless communication device, a third scheduling grant indicating a third scheduled period after the second scheduled period; receive, from the wireless communication device, a slot format indicator (SFI) indicating an uplink period between the second scheduled period and the third scheduled period; transmit, to the wireless communication device, an uplink communication signal during the third scheduled period, and where the apparatus may also include a processor configured to perform an LBT before transmitting the uplink signal based on the SFI indicating the uplink period between the second scheduled period and the third scheduled period. The apparatus may also include a processor configured to perform at least one of rate-matching or puncturing on the first communication signal based the LBT mode. The transceiver is further configured to transmit a message indicating a gap period configured for a plurality of wireless communication device including the wireless communication device, where the gap period is between the first scheduled period and the second scheduled period. The transceiver is further configured to receive, from the wireless communication device, a message indicating a gap period configured for a plurality of wireless communication device including the apparatus, where the gap period is between the first scheduled period and the second scheduled period.

Further embodiments of the present disclosure include a non-transitory computer readable medium having program code recorded thereon. The non-transitory computer readable medium includes code for causing a first wireless communication device to communicate, with a second wireless communication device, a first scheduling grant indicating a gap period within a first scheduled period. The non-transitory computer readable medium also includes code for causing the first wireless communication device to communicate, with the second wireless communication device during the first scheduled period, a first communication signal including a first silence period corresponding to the gap period.

In some aspects, the non-transitory computer-readable medium may also include where the code for causing the first wireless communication device to communicate the first scheduling grant is further configured to communicate, with the second wireless communication device, the first scheduling grant identifying the gap period from among a plurality of allowable gap periods within the first scheduled period. The non-transitory computer-readable medium may also include code for causing the first wireless communication device to communicate, with the second wireless communication device, a configuration message indicating the plurality of allowable gap periods within the first scheduled period. The first scheduled period includes a plurality of transmission slots and the gap period is located at a beginning or an end of a first transmission slot of the plurality of transmission slots. The code for causing the first wireless communication device to communicate the first communication signal is further configured to communicate, with the second wireless communication device, the first communication signal during the first transmission slot, and where the non-transitory computer-readable medium may also include further includes code for causing the first wireless communication device to communicate, with the second wireless communication device, a second communication signal during a second transmission slot of the plurality of transmission slots, where the first transmission slot is different from the second transmission slot. The non-transitory computer-readable medium may also include where the first scheduling grant indicates the gap period is located at the end of the first transmission slot; and the first transmission slot is located at an of the first scheduled period. The non-transitory computer-readable medium may also include code for causing the first wireless communication device to communicate, with the second wireless communication device during the gap period, a second scheduling grant for a second scheduled period after the first scheduled period. The non-transitory computer-readable medium may also include code for causing the first wireless communication device to communicate, with the second wireless communication device, a slot format indicator (SFI) indicating a downlink period within a second scheduled period; and code for causing the first wireless communication device to communicate, with the second wireless communication device during the second scheduled period, an uplink communication signal including a second silence period corresponding to the downlink period. The non-transitory computer-readable medium may also include code for causing the first wireless communication device to communicate, with the second wireless communication device, a discovery reference signal transmission schedule; and code for causing the first wireless communication device to communicate, with the second wireless communication device during a second scheduled period, a second communication signal including a second silence period corresponding to a time period during which the discovery reference signal transmission schedule overlaps with the second scheduled period. The non-transitory computer-readable medium may also include code for causing the first wireless communication device to communicate, with the second wireless communication device, a configuration indicating a random access resource; and code for causing the first wireless communication device to communicate, with the second wireless communication device during a second scheduled period, a second communication signal including a second silence period corresponding to a time period during which the random access resource overlaps with the second scheduled period. The code for causing the first wireless communication device to communicate the first communication signal is further configured to transmit, to the second wireless communication device, the first communication signal based on a listen-before-talk (LBT) mode. The non-transitory computer-readable medium may also include code for causing the first wireless communication device to determine the LBT mode based on a transmission status of the first wireless communication device in a time period before the first scheduled period. The code for causing the first wireless communication device to communicate the first scheduling grant is further configured to receive, from the second wireless communication device, the first scheduling grant indicating the LBT mode. The non-transitory computer-readable medium may also include code for causing the first wireless communication device to perform at least one of rate-matching or puncturing on the first communication signal based on the gap period.

Further embodiments of the present disclosure include a non-transitory computer-readable medium having program code recorded thereon. The non-transitory computer-readable medium includes code for causing a first wireless communication device to communicate, with a second wireless communication device, a first scheduling grant indicating a first scheduled period. The non-transitory computer-readable medium also includes code for causing the first wireless communication device to communicate, with the second wireless communication device, a second scheduling grant indicating a second scheduled period spaced apart from the first scheduled period. The non-transitory computer-readable medium also includes code for causing the first wireless communication device to communicate, with the second wireless communication device during the second scheduled period, a first communication signal based on the second scheduling grant and a listen-before-talk (LBT) mode determined based on the first scheduling grant and the second scheduling grant.

In some aspects, the non-transitory computer-readable medium may also include where the first scheduling grant indicates a rule for determining the LBT mode based on a gap period between the first scheduled period and the second scheduled period. The first scheduling grant indicates a rule for determining the LBT mode based on a transmission status in the first scheduled period before the second scheduled period. The second scheduling grant indicates a rule for determining the LBT mode based on a transmission duration of the first communication signal. The non-transitory computer-readable medium may also include code for causing the first wireless communication device to receive, from the second wireless communication device, a third scheduling grant indicating a third scheduled period after the second scheduled period; code for causing the first wireless communication device to receive, from the second wireless communication device, a slot format indicator (SFI) indicating a downlink period between the second scheduled period and the third scheduled period; and code for causing the first wireless communication device to transmit, to the second wireless communication device, an uplink communication signal during the third scheduled period without performing an LBT based on the SFI indicating the downlink period between the second scheduled period and the third scheduled period. The non-transitory computer-readable medium may also include code for causing the first wireless communication device to receive, from the second wireless communication device, a third scheduling grant indicating a third scheduled period after the second scheduled period; code for causing the first wireless communication device to receive, from the second wireless communication device, a slot format indicator (SFI) indicating an uplink period between the second scheduled period and the third scheduled period; code for causing the first wireless communication device to transmit, to the second wireless communication device, an uplink communication signal during the third scheduled period; and code for causing the first wireless communication device to perform an LBT before transmitting the uplink signal based on the SFI indicating the uplink period between the second scheduled period and the third scheduled period. The non-transitory computer-readable medium may also include code for causing the first wireless communication device to perform at least one of rate-matching or puncturing on the first communication signal based the LBT mode. The gap period is between the first scheduled period and the second scheduled period. The gap period is between the first scheduled period and the second scheduled period.

Further embodiments of the present disclosure include an apparatus including means for communicating, with a wireless communication device, a first scheduling grant indicating a gap period within a first scheduled period. The apparatus also includes means for communicating, with the wireless communication device during the first scheduled period, a first communication signal including a first silence period corresponding to the gap period.

In some aspects, the apparatus may also include where the means for communicating the first scheduling grant is further configured to communicate, with the wireless communication device, the first scheduling grant identifying the gap period from among a plurality of allowable gap periods within the first scheduled period. The apparatus may also include means for communicating, with the wireless communication device, a configuration message indicating the plurality of allowable gap periods within the first scheduled period. The first scheduled period includes a plurality of transmission slots and the gap period is located at a beginning or an end of a first transmission slot of the plurality of transmission slots. The means for communicating the first communication signal is further configured to communicate, with the wireless communication device, the first communication signal during the first transmission slot, and where the apparatus may also include means for communicating, with the wireless communication device, a second communication signal during a second transmission slot of the plurality of transmission slots, where the first transmission slot is different from the second transmission slot. The apparatus may also include where the first scheduling grant indicates the gap period is located at the end of the first transmission slot; and the first transmission slot is located at an of the first scheduled period. The apparatus may also include means for communicating, with the wireless communication device during the gap period, a second scheduling grant for a second scheduled period after the first scheduled period. The apparatus may also include means for communicating, with the wireless communication device, a slot format indicator (SFI) indicating a downlink period within a second scheduled period; and means for communicating, with the wireless communication device during the second scheduled period, an uplink communication signal including a second silence period corresponding to the downlink period. The apparatus may also include means for communicating, with the wireless communication device, a discovery reference signal transmission schedule; and means for communicating, with the wireless communication device during a second scheduled period, a second communication signal including a second silence period corresponding to a time period during which the discovery reference signal transmission schedule overlaps with the second scheduled period. The apparatus may also include means for communicating, with the wireless communication device, a configuration indicating a random access resource; and means for communicating, with the wireless communication device during a second scheduled period, a second communication signal including a second silence period corresponding to a time period during which the random access resource overlaps with the second scheduled period. The means for communicating the first communication signal is further configured to transmit, to the wireless communication device, the first communication signal based on a listen-before-talk (LBT) mode. The apparatus may also include means for performing at least one of rate-matching or puncturing on the first communication signal based on the gap period.

Further embodiments of the present disclosure include an apparatus including means for communicating, with a wireless communication device, a first scheduling grant indicating a first scheduled period. The apparatus also includes means for communicating, with the wireless communication device, a second scheduling grant indicating a second scheduled period spaced apart from the first scheduled period. The apparatus also includes means for communicating, with the wireless communication device during the second scheduled period, a first communication signal based on the second scheduling grant and a listen-before-talk (LBT) mode determined based on the first scheduling grant and the second scheduling grant.

In some aspects, the apparatus may also include where the first scheduling grant indicates a rule for determining the LBT mode based on a gap period between the first scheduled period and the second scheduled period. The first scheduling grant indicates a rule for determining the LBT mode based on a transmission status in the first scheduled period before the second scheduled period. The second scheduling grant indicates a rule for determining the LBT mode based on a transmission duration of the first communication signal. The apparatus may also include means for receiving, from the wireless communication device, a third scheduling grant indicating a third scheduled period after the second scheduled period; means for receiving, from the wireless communication device, a slot format indicator (SFI) indicating a downlink period between the second scheduled period and the third scheduled period; and means for transmitting, to the wireless communication device, an uplink communication signal during the third scheduled period without performing an LBT based on the SFI indicating the downlink period between the second scheduled period and the third scheduled period. The apparatus may also include means for receiving, from the wireless communication device, a third scheduling grant indicating a third scheduled period after the second scheduled period; means for receiving, from the wireless communication device, a slot format indicator (SFI) indicating an uplink period between the second scheduled period and the third scheduled period; means for transmitting, to the wireless communication device, an uplink communication signal during the third scheduled period; and means for performing an LBT before transmitting the uplink signal based on the SFI indicating the uplink period between the second scheduled period and the third scheduled period. The apparatus may also include means for performing at least one of rate-matching or puncturing on the first communication signal based the LBT mode. The gap period is between the first scheduled period and the second scheduled period. The gap period is between the first scheduled period and the second scheduled period.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a first downlink control information (DCI) associated with a first scheduled period, wherein the first scheduled period is associated with a gap period, wherein the first DCI indicates a first listen-before-talk (LBT) mode associated with the gap period;
communicating, by the first wireless communication device with the second wireless communication device during the first scheduled period, a first communication signal including a first silence period corresponding to the gap period;
communicating, by the first wireless communication device with the second wireless communication device before the first scheduled period, a second DCI associated with a second scheduled period after the first scheduled period, wherein the second scheduled period is associated with the gap period, and wherein the second DCI indicates a second LBT mode associated with the gap period, the second LBT mode being different from the first LBT mode; and
performing an LBT procedure during the gap period, wherein the LBT procedure is performed based on a selection of one of the first LBT mode or the second LBT mode, wherein the selection is based on a duration of the gap period.

2. The method of claim 1, further comprising:
communicating, by the first wireless communication device with the second wireless communication device, a configuration message indicating a plurality of allowable gap periods within the first scheduled period.

3. The method of claim 1, wherein the first scheduled period includes a plurality of transmission slots including a first transmission slot and the gap period is located at a beginning of the first transmission slot of the plurality of transmission slots.

4. The method of claim 3,
wherein the communicating the first communication signal includes:
communicating, by the first wireless communication device with the second wireless communication device, the first communication signal during the first transmission slot, and
wherein the method further comprises:
communicating, by the first wireless communication device with the second wireless communication device, a second communication signal during a second transmission slot of the plurality of transmission slots, wherein the first transmission slot is different from the second transmission slot.

5. The method of claim 3, wherein:
the first scheduling grant indicates the gap period is located at an end of the first transmission slot; and
the first transmission slot is located at an end of the first scheduled period.

6. The method of claim 1, further comprising:
communicating, by the first wireless communication device with the second wireless communication device, a slot format indicator (SFI) indicating a downlink period within a second scheduled period; and communicating, by the first wireless communication device with the second wireless communication device during the second scheduled period, an uplink communication signal including a second silence period corresponding to the downlink period.

7. The method of claim 1, further comprising:
communicating, by the first wireless communication device with the second wireless communication device, a discovery reference signal transmission schedule; and
communicating, by the first wireless communication device with the second wireless communication device during a second scheduled period, a second communication signal including a second silence period corresponding to a time period during which the discovery reference signal transmission schedule overlaps with the second scheduled period.

8. The method of claim 1, further comprising:
communicating, by the first wireless communication device with the second wireless communication device, a configuration indicating a random access resource; and
communicating, by the first wireless communication device with the second wireless communication device during a second scheduled period, a second communication signal including a second silence period corresponding to a time period during which the random access resource overlaps with the second scheduled period.

9. The method of claim 1, wherein the communicating the first communication signal includes:
transmitting, by the first wireless communication device to the second wireless communication device, the first communication signal based on one of the first LBT mode or the second LBT mode.

10. The method of claim 9, further comprising:
selecting, by the first wireless communication device, one of the first LBT mode or the second LBT mode based on a transmission status of the first wireless communication device in a time period before the first scheduled period.

11. The method of claim 1, further comprising:
performing, by the first wireless communication device, at least one of rate-matching or puncturing on the first communication signal based on the gap period.

12. An apparatus, comprising:
a memory;
a transceiver; and
at least one processor coupled to the memory and the transceiver, wherein the apparatus is configured to:
communicate, with a wireless communication device, a first downlink control information (DCI) associated with a first scheduled period, wherein the first scheduled period is associated with a gap period, wherein the first DCI indicates a first listen-before-talk (LBT) mode associated with the gap period;
communicate, with the wireless communication device during the first scheduled period, a first communication signal including a first silence period corresponding to the gap period;
communicate, with the wireless communication device, a second DCI associated with a second scheduled period after the first scheduled period, wherein the second scheduled period is associated with the gap period, and wherein the second DCI indicates a second LBT mode associated with the gap period, the second LBT mode being different from the first LBT mode; and perform an LBT procedure, wherein the LBT procedure is performed based on a selection of one of the first LBT mode or the second LBT mode, wherein the selection is based on a duration of the gap period.

13. The apparatus of claim 12, wherein the first scheduled period includes a plurality of transmission slots including a first transmission slot and the gap period is located at an end of the first transmission slot of the plurality of transmission slots.

14. The apparatus of claim 12, wherein the apparatus is further configured to:
communicate, with the wireless communication device, a slot format indicator (SFI) indicating a downlink period within a second scheduled period; and
communicate, with the wireless communication device during the second scheduled period, an uplink communication signal including a second silence period corresponding to the downlink period.

15. The apparatus of claim 12, wherein the apparatus is further configured to:
communicate, with the wireless communication device, a discovery reference signal transmission schedule; and
communicate, with the wireless communication device during a second scheduled period, a second communication signal including a second silence period corresponding to a time period during which the discovery reference signal transmission schedule overlaps with the second scheduled period.

16. The apparatus of claim 12, wherein the apparatus is further configured to:
communicate, with the wireless communication device, a configuration indicating a random access resource; and
communicate, with the wireless communication device during a second scheduled period, a second communication signal including a second silence period corresponding to a time period during which the random access resource overlaps with the second scheduled period.

17. The apparatus of claim 12, wherein the apparatus is further configured to communicate the first communication signal by:
transmitting, to the wireless communication device, the first communication signal based on one of the first LBT mode or the second LBT mode.

18. The apparatus of claim 12, wherein the apparatus is further configured to perform at least one of rate-matching or puncturing on the first communication signal based on the gap period.

19. A non-transitory computer-readable medium having program code recorded thereon, the program code comprising:
code for causing a first wireless communication device to communicate, with a second wireless communication device, a first downlink control information (DCI) associated with a first scheduled period, wherein the first scheduled period is associated with a gap period, wherein the first DCI indicates a first listen-before-talk (LBT) mode associated with the gap period;
code for causing the first wireless communication device to communicate, with the second wireless communication device during the first scheduled period, a first communication signal including a first silence period corresponding to the gap period; and
code for causing the first wireless communication device to communicate with the second wireless communication device, a second DCI associated with a second scheduled period after the first scheduled period, wherein the second scheduled period is associated with the gap period, and wherein the second DCI indicates a second LBT mode associated with the gap period, the second LBT mode being different from the first LBT mode; and code for causing the first wireless communication device to perform an LBT procedure, wherein the LBT procedure is performed based on a selection of one of the first LBT mode or the second LBT mode, wherein the selection is based on a duration of the gap period.

20. The non-transitory computer-readable medium of claim 19, wherein the first scheduled period includes a plurality of transmission slots including a first transmission slot and the gap period is located at a beginning of the first transmission slot of the plurality of transmission slots.

21. The non-transitory computer-readable medium of claim 19, further comprising:

code for causing the first wireless communication device to communicate, with the second wireless communication device, a slot format indicator (SFI) indicating a downlink period within a second scheduled period; and code for causing the first wireless communication device to communicate, with the second wireless communication device during the second scheduled period, an uplink communication signal including a second silence period corresponding to the downlink period.

22. The non-transitory computer-readable medium of claim 19, further comprising:

code for causing the first wireless communication device to communicate, with the second wireless communication device, a discovery reference signal transmission schedule; and code for causing the first wireless communication device to communicate, with the second wireless communication device during a second scheduled period, a second communication signal including a second silence period corresponding to a time period during which the discovery reference signal transmission schedule overlaps with the second scheduled period.

23. The non-transitory computer-readable medium of claim 19, further comprising:

code for causing the first wireless communication device to communicate, with the second wireless communication device, a configuration indicating a random access resource; and code for causing the first wireless communication device to communicate, with the second wireless communication device during a second scheduled period, a second communication signal including a second silence period corresponding to a time period during which the random access resource overlaps with the second scheduled period.

24. The non-transitory computer-readable medium of claim 19, wherein the code for causing the first wireless communication device to communicate the first communication signal is further configured to:

transmit, to the second wireless communication device, the first communication signal based on one of the first LBT mode or the second LBT mode.

25. The non-transitory computer-readable medium of claim 19, further comprising:

code for causing the first wireless communication device to perform at least one of rate-matching or puncturing on the first communication signal based on the gap period.

* * * * *